(12) United States Patent
Carlson

(10) Patent No.: US 7,066,971 B1
(45) Date of Patent: *Jun. 27, 2006

(54) METHODS OF PREPARING ELECTROCHEMICAL CELLS

(75) Inventor: Steven A. Carlson, Cambridge, MA (US)

(73) Assignee: Sion Power Corporation, Tucson, AZ (US)

( * ) Notice: Subject to any disclaimer, the term of this patent is extended or adjusted under 35 U.S.C. 154(b) by 466 days.

This patent is subject to a terminal disclaimer.

(21) Appl. No.: 10/148,156

(22) PCT Filed: Nov. 21, 2000

(86) PCT No.: PCT/US00/32231

§ 371 (c)(1),
(2), (4) Date: Sep. 30, 2002

(87) PCT Pub. No.: WO01/39293

PCT Pub. Date: May 31, 2001

Related U.S. Application Data

(60) Provisional application No. 60/167,150, filed on Nov. 23, 1999.

(51) Int. Cl.
*H01M 6/00* (2006.01)
(52) U.S. Cl. .................. 29/623.5; 429/34; 429/137; 429/164; 429/231.9
(58) Field of Classification Search .................. 429/33, 429/42, 94, 104, 112, 124, 129, 136, 161, 429/189, 209, 213, 249, 252, 303, 306, 310, 429/312, 320; 29/623.1, 623.2, 623.3, 623.4, 29/623.5; 106/409; 427/58, 77
See application file for complete search history.

(56) References Cited

U.S. PATENT DOCUMENTS 4,664,991 A  5/1987  Perichaud et al.

(Continued)

FOREIGN PATENT DOCUMENTS

WO  WO/1999/033125  7/1999

(Continued)

OTHER PUBLICATIONS

Ichinose et al., "A Surface Sol-Gel Process of $TiO_2$ and Other Metal Oxide Films with Molecular Precision," Chemistry of Materials; 1997, 9(6), 1296-1298.

*Primary Examiner*—Michael Barr
*Assistant Examiner*—Robert Hodge
(74) *Attorney, Agent, or Firm*—Jacqueline M. Nicol; David E. Rogers; Squire, Sanders & Dempsey LLP

(57) ABSTRACT

Methods of preparing a cathode/separator assembly for use in electrochemical cells in which a protective coating layer, such as a single ion conducting layer, is coated on a temporary carrier substrate, a microporous separator layer is then coated on the protective coating layer, and a cathode active layer is then coated on the separator layer, prior to removing the temporary carrier substrate from the protective coating layer. Additional layers, including an edge insulating layer, a cathode current collector layer, an electrode insulating layer, an anode current collector layer, an anode layer such as a lithium metal layer, and an anode protective layer, such as a single ion conducting layer, may be applied subsequent to the coating step of the microporous separator layer. Also, methods of preparing electrochemical cells utilizing cathode/separator assemblies prepared by such methods, and cathode/separator assemblies and electrochemical cells prepared by such methods.

19 Claims, 11 Drawing Sheets

U.S. PATENT DOCUMENTS

| | | |
|---|---|---|
| 4,739,018 A | 4/1988 | Armand et al. |
| 4,833,048 A | 5/1989 | DeJonghe et al. |
| 4,917,974 A | 4/1990 | DeJonghe et al. |
| 5,162,175 A | 11/1992 | Visco et al. |
| 5,194,341 A | 3/1993 | Bagley et al. |
| 5,314,765 A | 5/1994 | Bates |
| 5,324,599 A | 6/1994 | Oyama et al. |
| 5,439,760 A | 8/1995 | Howard et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,549,717 A | 8/1996 | Takeuchi et al. |
| 5,569,520 A | 10/1996 | Bates |
| 5,601,947 A | 2/1997 | Skotheim et al. |
| 5,648,187 A | 7/1997 | Skotheim |
| 5,690,702 A | 11/1997 | Skothem et al. |
| 5,731,104 A | 3/1998 | Ventura et al. |
| 5,840,087 A | 11/1998 | Gozdz et al. |
| 5,882,721 A | 3/1999 | Delnick |
| 6,117,590 A | 9/2000 | Skotheim et al. |
| 6,153,337 A | 11/2000 | Carlson et al. |
| 6,194,098 B1 | 2/2001 | Ying et al. |
| 6,201,100 B1 | 3/2001 | Gorkovenko et al. |
| 6,306,545 B1 | 10/2001 | Carlson et al. |
| 6,488,721 B1 * | 12/2002 | Carlson .................... 29/623.5 |

FOREIGN PATENT DOCUMENTS

| | | |
|---|---|---|
| WO | WO/1999/057770 | 11/1999 |
| WO | WO/2000/036670 | 6/2000 |
| WO | WO/2000/076011 | 12/2000 |
| WO | WO/2000/076014 | 12/2000 |

* cited by examiner

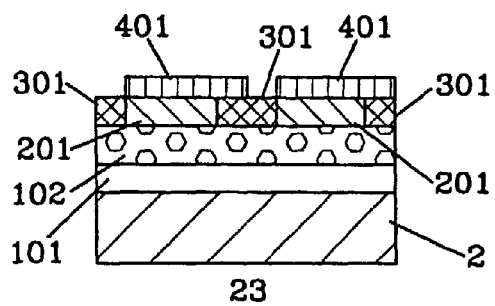
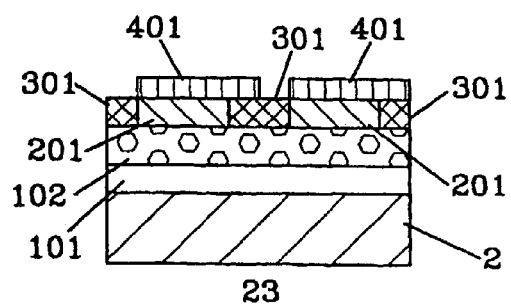
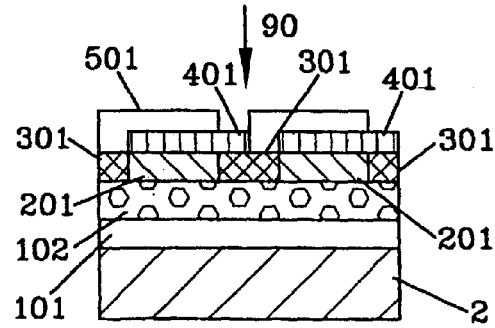
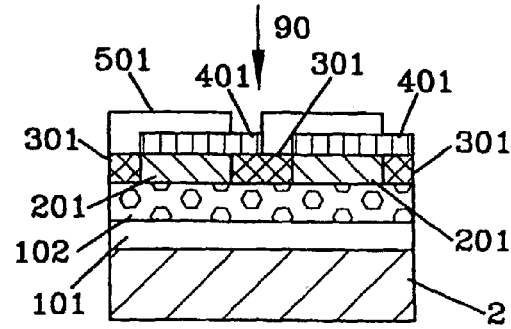
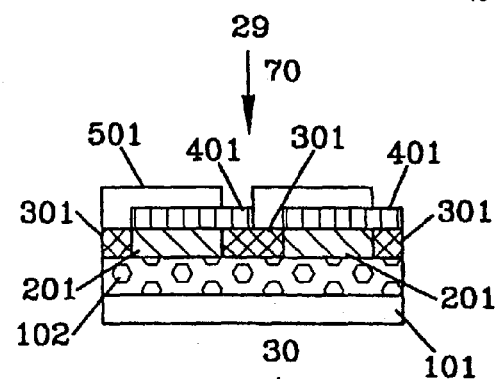
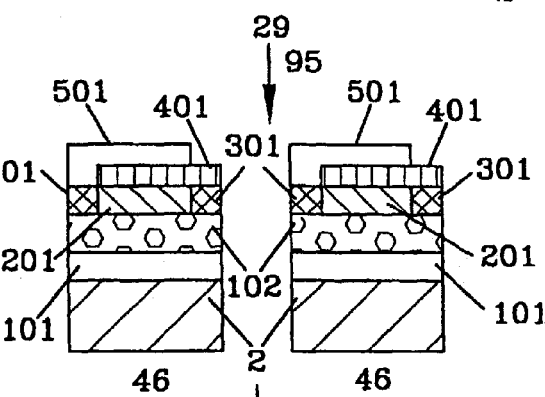
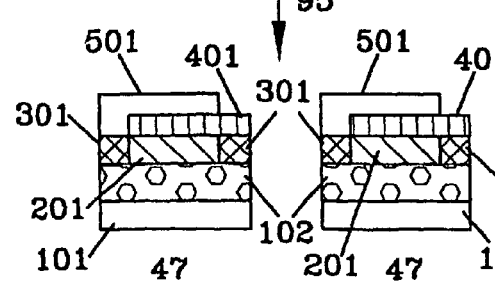
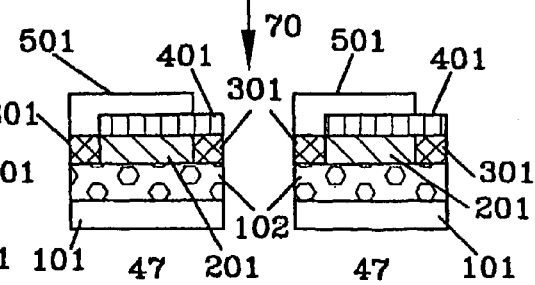
FIGURE 8A      FIGURE 8B

METHODS OF PREPARING ELECTROCHEMICAL CELLS

CROSS-REFERENCE TO RELATED APPLICATIONS

This application is the U.S. National Phase of International Application PCT/US00/32231, filed on 21 Nov. 2000, which claims priority to U.S. Provisional Application No. 60/167,150, which was filed 23 Nov. 1999.

TECHNICAL FIELD

The present invention relates generally to the fields of electrochemical cells and of separators for use in electrochemical cells. More particularly, this invention pertains to methods of preparing electrochemical cells and subassemblies of electrochemical cells comprising steps in which a microporous separator layer is coated on a temporary carrier substrate and a cathode active layer is then coated overlying the separator layer prior to removing the temporary carrier substrate from the separator layer. One or more protective coating layers, such as a single ion conducting layer, may be applied on the temporary carrier substrate prior to the coating step of the microporous separator layer. Also, additional layers, including an edge insulating layer, a cathode current collector layer, an electrode insulating layer, an anode current collector layer, an anode layer such as a lithium metal layer, and an anode protective layer, such as a single ion conducting layer, may be applied subsequent to the coating step of the microporous separator layer. The present invention also pertains to subassemblies of electrochemical cells and to electrochemical cells prepared by such methods.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

In an electrochemical cell or battery, an electrolyte element is interposed between the cathode and the anode to prevent the flow of electrons from the anode to the cathode, as would occur in a short circuit. This electrolyte element must be electronically nonconductive to prevent the short circuiting, but must permit the transport of ions between the anode and the cathode during cell discharge, and in the case of a rechargeable cell, also during recharge.

Typically, the electrolyte element contains a porous material, referred to as a separator since it separates or insulates the anode and the cathode from each other, and an aqueous or non-aqueous electrolyte in the pores of the separator. The aqueous or non-aqueous electrolyte typically comprises ionic electrolyte salts and water or electrolyte solvents, and optionally, other materials or additives such as, for example, ionically conductive polymers. A variety of materials have been used for the porous layer or separator of the electrolyte element in electrochemical cells. These porous separator materials include polyolefins such as polyethylenes and polypropylenes, glass fiber and paper filter papers, and ceramic materials. Usually these separator materials are supplied as porous free standing films which are interleaved with the anodes and the cathodes in the fabrication of electrochemical cells. Alternatively, the porous layer can be applied directly to one of the electrodes, for example, as described in U.S. Pat. No. 5,194,341 to Bagley et al. and U.S. Pat. No. 5,882,721 to Delnick; and in Eur. Pat. Application Nos. 848,435 to Yamashita et al.; 814,520 and 875,950, both to Delnick; and 892,449 to Bogner.

U.S. patent application Ser. No. 08/995,089 titled "Separators for Electrochemical Cells," filed Dec. 19, 1997, to Carlson et al. of the common assignee, describes separators for use in electrochemical cells which comprise a microporous layer of a dried sol, such as a dried pseudo-boehmite sol, and electrolyte elements and cells comprising such separators. These dried sol or xerogel separators and methods of preparing such separators are described for both free standing separators and as a separator layer coated directly onto an electrode.

When a separator layer is coated directly onto an electrode, such as onto the cathode, the porous separator coating may require a relatively smooth, uniform surface on the cathode and also may require a mechanically strong and flexible cathode layer. For example, for a microporous pseudo-boehmite layer having a xerogel structure, smooth, strong, and flexible cathode layer properties may be required to prevent coating non-uniformities, excessive stresses, and possible cracking of the xerogel layer during drying of the sol coating on the cathode surface and also during fabrication and use of electrochemical cells containing the xerogel-based separator. Cracking of the coated separator layer may lead to short circuiting of the cell.

It would be advantageous to be able to prepare electrochemical cells having separators with ultrafine pores and with reduced thicknesses of less than 15 microns that are coated in contact to one or more other layers of the electrochemical cell by a process of coating without cracking or other non-uniformities in the separator that may lead to short circuiting.

SUMMARY OF THE INVENTION

One aspect of the present invention pertains to methods of preparing a cathode/separator assembly of an electrochemical cell, wherein the cathode/separator assembly comprises a cathode active layer and a microporous separator layer, which methods comprise the steps of (a) coating a first protective coating layer on a temporary carrier substrate; (b) coating a microporous separator layer on the first protective coating layer; (c) coating a cathode active layer in a desired pattern on a surface of the separator layer, which surface is on the side of the separator layer opposite from the first protective coating layer; and (d) removing the temporary carrier substrate from the first protective coating layer to form the cathode/separator assembly. In one embodiment, the first protective coating layer is a single ion conducting layer, such as, for example, a single ion conducting layer that only conducts lithium ions in a lithium electrochemical cell, but does not transport electrolyte solvents, ionic electrolyte salts, and other materials besides lithium ions. Suitable single ion conducting layers include, but are not limited to, glassy layers comprising a glassy material selected from the group consisting of lithium silicates, lithium borates, lithium aluminates, lithium phosphates, lithium phosphorus oxynitrides, lithium silicosulfides, lithium germanosulfides, lithium lanthanum oxides, lithium titanium oxides, lithium borosulfides, lithium aluminosulfides, and lithium phosphosulfides. In a preferred embodiment, the single ion conducting layer comprises a lithium phosphorus oxynitride. In one embodiment, the first protective coating layer is an ionically conductive layer which is impervious to dimethoxyethane and 1,3-dioxolane, and to combinations thereof. In one embodiment, the first protective coating layer comprises a polymer selected from the group consisting of electrically conductive polymers, ionically conductive polymers, sulfonated polymers, and hydrocarbon polymers. In one embodiment, the first protective coating layer comprises an electrically conductive pigment. In one embodiment, the first protective coating layer comprises an aromatic hydrocarbon.

In one embodiment of the methods of preparing a cathode/separator assembly of this invention, the separator layer comprises one or more microporous xerogel layers. In one embodiment, the cathode/separator assembly further comprises a second protective coating layer, wherein the second protective coating layer is in contact with at least one of the one or more microporous xerogel layers of the separator layer. In one embodiment, one of the one or more protective coating layers of the cathode/separator assembly is coated directly on the temporary carrier substrate, and one of the one or more microporous xerogel layers of the microporous separator layer is then coated on a surface of the one of the one or more protective coating layers, which surface is on the side of the one of the one or more protective coating layers opposite from the temporary carrier substrate, and further wherein the temporary carrier substrate is removed in step (c) from the surface of the one of the one or more protective coating layers, which surface is on the side of the one of the one or more protective coating layers opposite from the separator layer. In one embodiment, the second protective coating layer of the cathode/separator assembly is coated in step (b) directly on the surface of the first protective coating layer, which surface is on the side of the first protective coating layer opposite from the temporary carrier substrate layer, prior to coating the cathode active layer. In one embodiment, the second protective coating layer is a single ion conducting layer. In one embodiment, the second protective coating layer is an ionically conductive layer which is impervious to dimethoxyethane and 1,3-dioxolane and combinations thereof.

In a preferred embodiment of the methods of preparing a cathode/separator assembly of this invention, the separator layer comprises one or more microporous pseudo-boehmite layers. In a more preferred embodiment, the cathode/separator assembly further comprises a second protective coating layer, wherein the second protective coating layer is in contact with at least one of the one or more microporous pseudo-boehmite layers of the separator layer. In one embodiment, the second protective coating layer is coated directly on the first protective coating layer, and one of the one or more microporous pseudo-boehmite layers of the microporous separator layer is then coated on a surface of the second protective coating layer, which surface of the second protective coating layer is on the side opposite from the first protective coating layer. In one embodiment, the second protective coating layer is coated in step (b) directly on the surface of one of the one or more microporous pseudo-boehmite layers of the separator layer, prior to coating the cathode active layer. In one embodiment, the second protective coating layer is a single ion conducting layer. In one embodiment, the second protective coating layer is an ionically conductive layer which is impervious to dimethoxyethane and 1,3-dioxolane and combinations thereof.

In one embodiment of the methods of preparing a cathode/separator assembly of the present invention, the temporary carrier substrate is a flexible web substrate. Suitable web substrates include, but are not limited to, papers, polymeric films, and metals. In one embodiment, the flexible web substrate is surface treated with a release agent.

In one embodiment of the methods of preparing a cathode/separator assembly of this invention, the cathode active layer comprises an electroactive material selected from the group consisting of electroactive metal chalcogenides, electroactive conductive polymers, and electroactive sulfur-containing materials, and combinations thereof. In one embodiment, the cathode active layer comprises elemental sulfur. In one embodiment, the cathode active layer comprises an electroactive sulfur-containing organic polymer, wherein the polymer, in its oxidized state, comprises one or more polysulfide moieties selected from the group consisting of: $-S_m-$, $-S_m^-$, and $S_m^{2-}$; where m is an integer equal to or greater than 3.

In one embodiment of the methods of preparing a cathode/separator assembly of the present invention, the desired pattern of the cathode active layer does not completely coat or cover the surface of the separator layer, which surface is on the side of the separator layer opposite from the first protective coating layer. In one embodiment, the desired pattern of the cathode active layer does not completely coat the second surface of the second protective coating layer when the second protective coating layer is coated onto the separator layer.

In one embodiment, the methods further comprise a step of coating an edge insulating layer in a desired pattern on the surface of the separator layer. In one embodiment, the step of coating the edge insulating layer occurs subsequent to the steps of coating the first protective coating, microporous separator, and cathode active layers and prior to the step of removing the temporary carrier substrate from the first protective coating layer. In one embodiment, the desired pattern of the edge insulating layer comprises substantially the remaining area of the surface of the separator layer that is not coated with the desired pattern of the cathode active layer. In one embodiment, a portion of the desired pattern of the edge insulating layer is in contact with a portion of the desired pattern of the cathode active layer. In one embodiment, the thickness of the edge insulating layer is substantially the same as the thickness of the cathode active layer. In one embodiment, the step of coating the edge insulating layer occurs subsequent to the step of coating the first protective coating and microporous separator layers and prior to the steps of coating the cathode active layer and removing the temporary carrier substrate from the first protective coating layer. In one embodiment, the edge insulating layer comprises an insulating xerogel layer. In one embodiment, the edge insulating layer comprises an insulating non-porous, polymeric layer. In one embodiment, the edge insulating layer is a single ion conducting layer. In one embodiment, the edge insulating layer is an ionically conductive layer which is impervious to dimethoxyethane and 1,3-dioxolane and combinations thereof.

In one embodiment of the methods of preparing a cathode/separator assembly of this invention, the methods further comprise a step of depositing a cathode current collector layer in a desired pattern on the surface of the cathode active layer, which surface is on the side opposite from the separator layer. In one embodiment, the step of depositing the cathode current collector layer occurs subsequent to the steps of coating the first protective coating, microporous separator, and cathode active layers and prior to the step of removing the temporary carrier substrate from the first protective coating layer. In one embodiment, the methods further comprise a step of coating an electrode insulating layer in a desired pattern on the surface of the cathode current collector layer, which surface is on the side opposite from the cathode active layer. In one embodiment, the methods further comprise a step of depositing an anode current collector layer in a desired pattern on the electrode insulating layer.

In one embodiment of the methods of preparing a cathode/separator assembly of the present invention, the methods further comprise a step of depositing a cathode current collector layer in a desired pattern on the outer surface of the cathode active layer and, optionally, on the outer surface of the edge insulating layer. In one embodiment, the step of depositing the cathode current collector layer occurs subsequent to the steps of coating the first protective coating, microporous separator, cathode active, and edge insulating layers, and prior to the step of removing the temporary carrier substrate from the first protective coating layer. In one embodiment, the step of depositing the cathode current collector layer occurs subsequent to the steps of coating the first protective coating, microporous separator, and cathode active layers, prior to the step of coating the edge insulating layer, and prior to the step of removing the temporary carrier substrate from the first protective coating layer. In one embodiment, the methods further comprise a step of coating an electrode insulating layer in a desired pattern on the outer surface of the cathode current collector layer and, optionally, on the outer surface of the edge insulating layer.

Another aspect of the present invention pertains to methods of preparing an electrochemical cell, which methods comprise the steps of: (a) providing a cathode/separator assembly prepared by a method comprising the steps of (i) coating a first protective coating layer on a temporary carrier substrate, as described herein; (ii) coating a microporous separator layer on the first protective coating layer; (iii) coating a cathode active layer, as described herein, in a desired pattern on a surface of the separator layer, which surface is on the side of the separator layer opposite from the first protective coating layer, and (iv) removing the temporary carrier substrate from the first protective coating layer to form the cathode/separator assembly; (b) providing an anode; (c) providing a cathode current collector layer; (d) providing an electrode insulating layer interposed between the anode and the cathode current collector layer; and (e) providing an electrolyte, wherein the electrolyte is contained in the pores of the separator layer; and wherein the first protective coating layer of the cathode/separator assembly and the anode are positioned in a face-to-face relationship and the cathode active layer and the cathode current collector layer are positioned in a face-to-face relationship. In one embodiment, the first protective coating layer is a single ion conducting layer. In one embodiment, the first protective coating layer is an ionically conductive layer which is impervious to dimethoxyethane and 1,3-dioxolane and combinations thereof. In one embodiment, the separator layer comprises one or more microporous xerogel layers. In one embodiment, the cathode/separator assembly further comprises a second protective coating layer, wherein the second protective coating layer is in contact with at least one of the one or more microporous xerogel layers of the separator layer. In one embodiment, the second protective coating layer is a single ion conducting layer. In one embodiment, the second protective coating layer is an ionically conductive layer which is impervious to dimethoxyethane and 1,3-dioxolane, and to combinations thereof.

In a preferred embodiment of the methods of preparing an electrochemical cell of this invention, the separator layer comprises one or more microporous pseudo-boehmite layers. In a more preferred embodiment, the electrochemical cell further comprises a second protective coating layer, wherein the second protective coating layer is in contact with at least one of the one or more microporous pseudo-boehmite layers of the separator layer.

In one embodiment of the methods of preparing an electrochemical cell of this invention, the anode comprises an anode active material selected from the group consisting of lithium metal, lithium-aluminum alloys, lithium-tin alloys, lithium-intercalated carbons, and lithium-intercalated graphites. Suitable electrolytes include liquid electrolytes, gel polymer electrolytes, solid polymer electrolytes, and single ion conducting electrolytes. In one embodiment, the electrolyte comprises a liquid electrolyte.

In one embodiment of the methods of preparing an electrochemical cell of the present invention, the electrode insulating layer comprises a polymeric plastic film. In one embodiment, the electrode insulating layer comprises a polymeric coating.

In one embodiment of the methods of preparing an electrochemical cell of this invention, the cell is a secondary cell. In one embodiment of the methods of preparing an electrochemical cell of this invention, the cell is a primary cell.

Another aspect of the present invention pertains to methods of preparing an electrochemical cell, which methods comprise the steps of (a) coating a first protective coating layer on a temporary carrier substrate, as described herein; (b) coating a microporous separator layer, as described herein, on the first protective coating layer, (c) coating a cathode active layer, as described herein, in a desired pattern on a surface of the separator layer, which surface is on the side of the separator layer opposite from the first protective coating layer; (d) depositing a cathode current collector layer in a desired pattern on the cathode active layer, which surface is on the side of the cathode active layer opposite from the separator layer; (e) depositing an electrode insulating layer in a desired pattern on a surface of the cathode current collector layer, which surface is on the side of the cathode current collector layer opposite from the cathode active layer; (f) depositing an anode current collector layer in a desired pattern on a surface of the electrode insulating layer, which surface is on the side of the electrode insulating layer opposite from the cathode current collector layer; (g) depositing an anode active material layer in a desired pattern on a surface of the anode current collector layer, which surface is on the side of the anode current collector layer opposite from the electrode insulating layer; (h) removing the temporary carrier substrate from the first protective coating layer; and (i) providing an electrolyte, wherein the electrolyte is contained in the pores of the separator layer. In one embodiment, step (g) of the methods further comprises depositing an anode protective coating layer on the anode active material. In one embodiment, the anode protective coating layer is a single ion conducting layer. Suitable single ion conducting layers for the anode protective coating layer include, but are not limited to, glassy layers comprising a glassy material selected from the group consisting of lithium silicates, lithium borates, lithium aluminates, lithium phosphates, lithium phosphorus oxynitrides, lithium silicosulfides, lithium germanosulfides, lithium lanthanum oxides, lithium titanium oxides, lithium borosulfides, lithium aluminosulfides, and lithium phosphosulfides. In a preferred embodiment, the single ion conducting layer comprises a lithium phosphorus oxynitride. In one embodiment, the anode protective coating layer is an ionically conductive layer which is impervious to dimethoxyethane and 1,3- dioxolane, and combinations thereof. In one embodiment, the anode protective coating layer comprises a polymer selected from the group consisting of electrically conductive polymers, ionically conductive polymers, sulfonated polymers, and hydrocarbon polymers. In one embodiment, the anode protective coating layer comprises an electrically conductive pigment. In one embodiment, the anode protective coating layer comprises an aromatic hydrocarbon. In one embodiment, the anode protective coating layer comprises a metal, such as copper, that forms an alloy with lithium.

Another aspect of this invention pertains to methods of preparing an electrochemical cell comprising a casing and a multilayer cell stack, which methods comprise the steps of (a) providing a laminar combination of: (i) an anode assembly comprising an anode having an anode active layer; wherein the anode active layer comprises an anode active material comprising lithium, a first cathode current collector layer, and an electrode insulating layer interposed between the anode and the first cathode current collector layer; and (ii) a cathode/separator assembly comprising a first protective coating layer; a microporous separator layer underlying the first protective coating layer; a cathode active layer in a first desired coating pattern on a surface of the microporous separator layer, which surface is on the side of the separator layer opposite from the first protective coating layer, and an edge insulating layer in a second desired coating pattern on the surface of the separator layer; wherein the first cathode current collector layer and the cathode active layer are positioned in a face-to-face relationship; (b) winding the laminar combination to form an anode-electrode insulating layer-first cathode current collector layer-cathode/separator assembly multilayer cell stack, wherein the first cathode current collector layer is in contact with the cathode active layer; (c) providing an electrolyte, wherein the electrolyte is contained in the pores of the separator layer; (d) providing a casing to enclose the cell stack; and (e) sealing the casing. In one embodiment, the anode further comprises an anode current collector layer interposed between the anode active layer and the electrode insulating layer. In one embodiment, a second cathode current collector layer is deposited in a third desired pattern on the outer surface of the cathode active layer and on the outer surface of the edge insulating layer.

In one embodiment of the methods of preparing an electrochemical cell of this invention, the cathode/separator assembly of step (a) further comprises a temporary carrier substrate on a surface of the first protective coating layer, which surface is on the side of the first protective coating layer opposite from the separator layer, and the methods further comprise a step of removing the temporary carrier substrate from the first protective coating layer prior to completion of step (b). In one embodiment, a second cathode current collector layer is deposited in a third desired coating pattern on the outer surface of the cathode active layer and on the outer surface of the edge insulating layer.

In one embodiment of the methods of preparing an electrochemical cell of the present invention, the anode of the anode assembly and the first protective coating layer of the cathode/separator assembly are positioned in a face-to-face relationship in step (a), and a first cathode current collector layer-electrode insulating layer-anode-cathode/separator assembly multilayer cell stack is formed in step (b). In one embodiment, a second cathode current collector layer is deposited in a third desired coating pattern on the outer surface of the cathode active layer and on the outer surface of the edge insulating layer. In one embodiment, the cathode/separator assembly of step (a) further comprises a temporary carrier substrate on a surface of the first protective coating layer, which surface is on the side of the first protective coating layer opposite from the separator layer, and the methods further comprise a step of removing the temporary carrier substrate from the first protective coating layer prior to completion of step (b). In one embodiment, a second cathode current collector layer is deposited in a third desired coating pattern on the outer surface of the cathode active layer and on the outer surface of the edge insulating layer.

In one embodiment of the methods of preparing an electrochemical cell of this invention, the first protective coating layer is a single ion conducting layer. In one embodiment, the first protective coating layer is an ionically conductive layer which is impervious to dimethoxyethane and 1,3-dioxolane and combinations thereof. In one embodiment, the electrochemical cell is a secondary cell. In one embodiment, the electrochemical cell is a primary cell.

Another aspect of this invention pertains to methods of preparing an electrochemical cell comprising a casing and a multilayer cell stack, which methods comprise the steps of (a) providing a laminar combination of: (i) an anode assembly comprising an anode comprising lithium metal; and, (ii) a cathode/separator assembly comprising a first protective coating layer, a microporous separator layer underlying the first protective coating layer, a cathode active layer in a first desired coating pattern on a surface of the microporous separator layer, which surface is on the side of the separator layer opposite from the first protective coating layer, and an edge insulating layer in a second desired coating pattern on the surface of the separator layer; a cathode current collector layer in a third desired coating pattern on the outer surface of the cathode active layer and on the outer surface of the edge insulating layer; an electrode insulating layer in a fourth desired coating pattern on the outer surface of the cathode current collector layer and on the outer surface of the edge insulating layer; wherein the anode and the electrode insulating layer are positioned in a face-to-face relationship; (b) winding the laminar combination to form an anode-electrode insulating layer-cathode current collector layer-cathode/separator assembly multilayer cell stack, wherein the cathode current collector layer is in contact with the cathode active layer; (c) providing an electrolyte, wherein the electrolyte is contained in the pores of the separator layer; (d) providing a casing to enclose the cell stack; and (e) sealing the casing. In one embodiment, the cathode/separator assembly of step (a) further comprises a temporary carrier substrate on a surface of the first protective coating layer, which surface is on the side of the first protective coating layer opposite from the separator layer, and the methods further comprise a step of removing the temporary carrier substrate from the first protective coating layer prior to completion of step (b). In one embodiment, the anode and the first protective coating layer of the cathode/separator assembly are positioned in a face-to-face relationship in step (a), and an anode-cathode/separator assembly-cathode current collector layer-electrode insulating layer multilayer cell stack is formed in step (b).

Another aspect of this invention pertains to cathode/separator assemblies prepared according to the methods of this invention, as described herein. Another aspect of the present invention pertains to electrochemical cells prepared according to the methods of the present invention, as described herein.

BRIEF DESCRIPTION OF THE DRAWINGS

FIGS. 8A and 8B show representative process flow diagrams with cross-sectional views of two other embodiments of the methods of preparing a cathode/separator assembly of the present invention, which further comprises, for FIG. 8A, an electrode insulating layer coating step 90 prior to the temporary carrier substrate removing step 70, in comparison to the embodiment illustrated in FIG. 7A; and which further comprises, for FIG. 8B, an electrode insulating layer coating step 90 prior to the slitting step 95, in comparison to the embodiment illustrated in FIG. 7B.

DETAILED DESCRIPTION OF THE INVENTION

Figure 1:
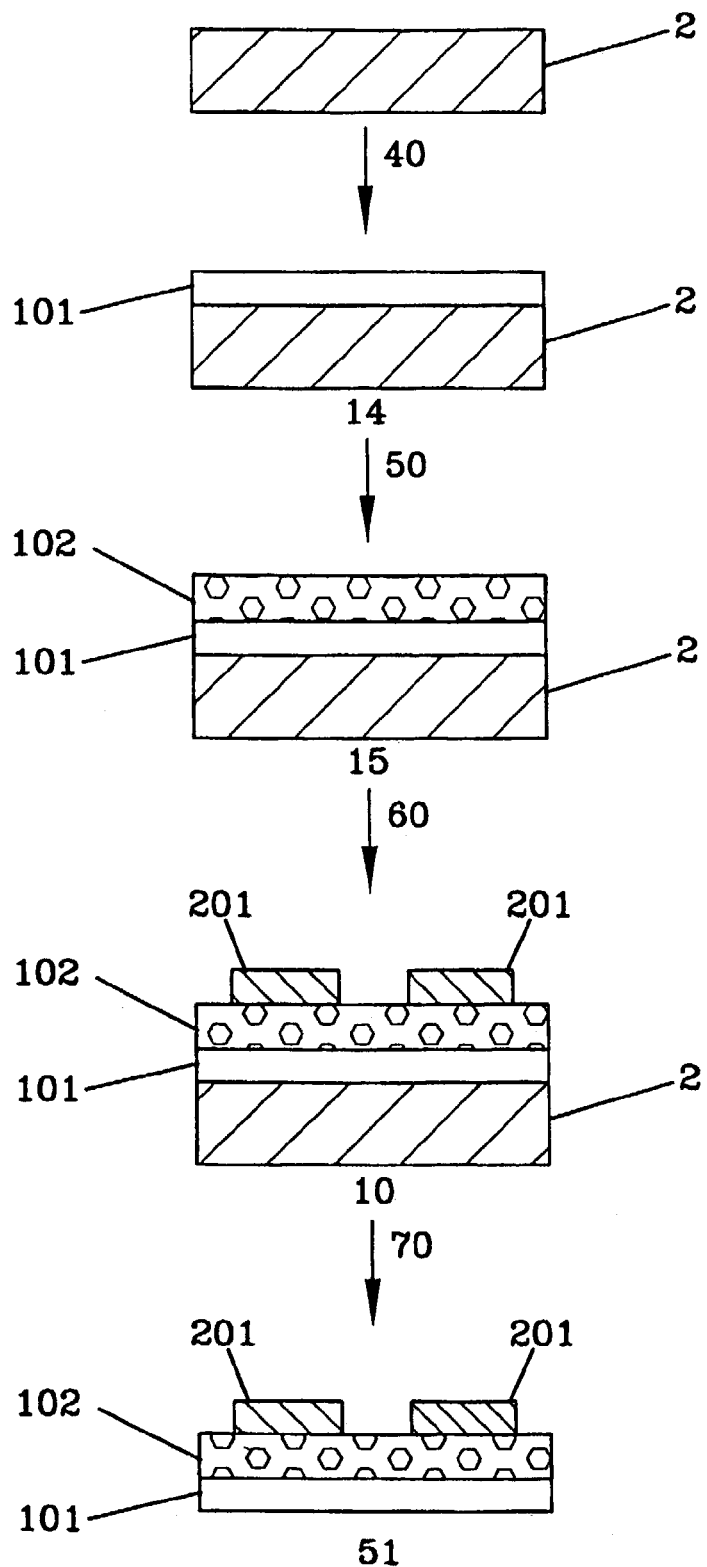
FIG. 1 shows a representative process flow diagram with cross-sectional views of one embodiment of the methods of preparing a cathode/separator assembly of the present invention, which comprises a first protective layer coating step 40, a microporous separator coating step 50, a cathode active layer coating step 60, and a temporary carrier substrate removing step 70.

Many microporous coatings, particularly microporous xerogel coatings which are typically subject to a high level of stresses and potential cracking during drying, formation, and mechanical handling of the three-dimensional gel structure in the microporous layer, are difficult to obtain at the desired quality level when coated on surfaces which are rough and non-uniform or which have poor mechanical strength and flexibility properties. Also, many thin coatings, such as on the order of 10 microns or less and particularly when the coating layer thickness is about 2 microns or less, are similarly difficult to obtain as uniform and continuous layers when coated on surfaces which are rough and non-uniform or which have poor mechanical strength and flexibility properties. A rough and non-uniform coating surface may cause a wide variation in the thicknesses of microporous, thin, and other coatings applied to this surface. Besides possibly causing the formation of sections of the coating layer which are too thin or too thick for the desired application, these thickness variations may interfere with the desired level and uniformity of the microporosity and other properties and with the mechanical strength and cracking resistance of the microporous and other layers. The tendency for reduced mechanical flexibility and cracking may be particularly true when the thickness of a microporous coating layer is significantly above that needed for the desired application. Also, a coating surface with poor mechanical strength and flexibility may induce, for example, stresses, mechanical failure, poor adhesion, and cracking in a microporous or other layer coated on this surface.

Examples of applications for microporous and other coatings, including microporous xerogel coatings, where a relatively smooth surface and a mechanically strong layer on which to apply and form the microporous or other coatings would be useful, include, but are not limited to, microporous separators and other layers for contact to one or more electrodes of an electrochemical cell; microporous ink jet ink-receptive layers for contact to a wide variety of rough, uneven support surfaces such as papers, fabrics, canvas, and spun-woven plastics; and microporous filtration layers for contact to a wide variety of rough, uneven substrates such as papers. For example, for the product application of microporous separators and other layers involving contact to the positive electrode or cathode of an electrochemical cell, the roughness and non-uniformity of the cathode surface prior to coating the microporous separator or other layer on it may be reduced, for example, by calendering the cathode surface or by applying a thin uniform coating to the cathode surface. However, the reduction of the roughness and non-uniformity of the cathode surface by these approaches may still not be sufficient and also may not prevent undesirable results from poor mechanical strength and flexibility of the cathode and from penetration of the separator or other coating into porous areas of the cathode during the coating application process.

The present invention overcomes these limitations for preparing microporous and other coatings for a wide variety of applications, such as separators and protective coating layers for use in electrochemical cells, ink jet ink-receptive media, filtration materials, and other product applications. One aspect of the present invention pertains to methods of preparing an electrochemical cell, which methods comprise the steps of (a) coating a protective coating layer on a temporary carrier substrate, (b) coating a microporous separator layer on the protective coating layer, (c) coating a cathode active layer and any other desired layers in desired coating patterns built up on the surface of the separator layer on the side opposite from the protective coating layer, (d) laminating or contacting the cathode/separator assembly resulting from steps (a), (b), and (c) to a desired substrate, such as an anode assembly comprising an anode active layer, and (e) removing the temporary carrier substrate from the protective coating layer before step (d) or, alternatively, after step (d). The surface of the temporary carrier substrate is selected to have the smoothness, mechanical strength, flexibility, and porosity properties that are desirable for the preparation of the protective coating, and any subsequent microporous and other coating layers, by coating on the surface of the substrate and to also have suitable release properties for removal of the temporary carrier substrate in step (e).

This method of applying a protective coating layer or a microporous layer to a temporary carrier substrate, subsequent coating of one or more other layers overlying the protective coating or microporous layers, and the subsequent removal of the temporary carrier substrate from the protective coating or microporous layer is particularly useful when the protective coating layer is thin, such as a thickness less than 2 microns, and when the microporous layer comprises one or more microporous xerogel layers. Besides applications in electrochemical cells, this method may be readily adapted for a wide variety of other product applications, including ink jet ink-receptive media and filtration materials, where microporous and thin coating layers may be utilized.

Methods of Preparing a Cathode/Separator Assembly

One aspect of the present invention pertains to methods of preparing a cathode/separator assembly of an electrochemical cell, wherein the cathode/separator assembly comprises a cathode active layer and a microporous separator layer, which methods comprise the steps of (a) coating a first protective coating layer on a temporary carrier substrate, wherein the first protective coating layer has a first surface in contact with the temporary carrier substrate and has a second surface on the side opposite from the temporary carrier substrate; (b) coating a microporous separator layer on the second surface of the first protective coating layer, wherein the separator layer has a first surface in contact with the second surface of the first protective coating layer and has a second surface on the side opposite from the first protective coating layer; (c) coating a cathode active layer in a desired pattern on the second surface of the separator layer, wherein the cathode active layer has a first surface in contact with the second surface of the separator layer and has a second surface on the side opposite from the separator layer; and (d) removing the temporary carrier substrate from the first surface of the first protective coating layer to form the cathode/separator assembly.

One embodiment of this aspect of the present invention is illustrated in FIG. 1. Referring to FIG. 1 (not drawn to scale), in a protective coating step 40, a first protective coating layer 101 is coated unto a surface of a temporary carrier substrate 2 to form composite 14. Next, in a microporous separator coating step 50, a microporous separator layer 102 is coated onto the surface of the first protective coating layer 101 to form composite 15 comprising temporary carrier substrate 2, first protective coating layer 101, and microporous separator layer 102. Next, in a cathode active layer coating step 60, a cathode active layer 201 is coated in a desired pattern onto the surface of the microporous separator layer 102 to form composite 10 comprising temporary carrier substrate 2, first protective coating layer 101, microporous separator layer 102, and cathode active layer 201. Following this step, in a temporary carrier substrate removing step 70, the temporary carrier substrate 2 is removed from the first protective coating layer 101 of composite 10 to form cathode/separator assembly 51 comprising first protective coating layer 101, microporous separator layer 102, and cathode active layer 201.

The incorporation of a first protective coating layer in the cathode/separator assembly of the methods of this invention enhances the mechanical strength and adds flexibility to microporous separator layers comprising one or more microporous layers, particularly those separator layers comprising one or more microporous xerogel layers. Also, importantly, the first protective coating layer by virtue of its positioning between the anode and the separator of the electrolyte element in the electrochemical cell may function to reduce or eliminate degradation of the anode by contact with electrolyte solvents, electrolyte salts, cathode reduction products, and other materials of the electrolyte and cathode parts of the cell. For example, the first protective coating layer may encapsulate the outer surfaces of the cathode/separator assembly and act as a barrier to migration of undesired materials to the surface of the anode, such as the lithium surface. This barrier may be a single ion conducting layer which allows the necessary movement of lithium ions for the functioning of the cell but which does not allow, or greatly inhibits, the movement of anions, such as anions of the electrolyte salts and any anions formed by the cathode active materials, such as polysulfide and sulfide anions in the case of electroactive sulfur-containing cathodes. Also, this barrier may be an impermeable barrier against solvents such that the barrier does not allow, or greatly inhibits, the movement of electrolyte solvents, and any dissolved materials in these solvents, to the surface of the anode. To achieve this functioning as a barrier layer to protect the anode, the first protective coating layer typically is not microporous.

Also, in an assembled cell, the first protective coating layer may be directly in contact with the anode surface and thereby provide protection for the anode. Although protection for the anode may be provided, for example, by conductive polymer coating layers or single ion conducting layers coated directly on the anode, it may be more desirable and effective to provide the protective layers for the anode as an outer layer of the separator and electrolyte element on the side opposite from the cathode. This configuration in an assembled cell may more effectively accommodate the changes during charge and discharge cycles of the cell, such as, for example, thickness and surface changes of the anode during charge and discharge cycles.

In one embodiment, the first protective coating layer is a single ion conducting layer. Single ion conducting layers have the capability of exclusively transporting cations, such as lithium ions, and may comprise polymers such as, for example, disclosed in U.S. Pat. No. 5,731,104 to Ventura, et al. Suitable single ion conducting layers include, but are not limited to, glassy layers comprising a glassy material selected from the group consisting of lithium silicates, lithium borates, lithium aluminates, lithium phosphates, lithium phosphorus oxynitrides, lithium silicosulfides, lithium germanosulfides, lithium lanthanum oxides, lithium titanium oxides, lithium borosulfides, lithium aluminosulfides, and lithium phosphosulfides. In a preferred embodiment, the single ion conducting layer comprises a lithium phosphorus oxynitride. Electrolyte films of lithium phosphorus oxynitride are disclosed, for example, in U.S. Pat. No. 5,569,520 to Bates. A thin film layer of lithium phosphorus oxynitride interposed between a lithium anode and an electrolyte is disclosed, for example, in U.S. Pat. No. 5,314,765 to Bates.

In one embodiment, the first protective coating layer is an ionically conductive layer which is impervious to dimethoxyethane and 1,3-dioxolane and combinations thereof. The barrier properties to transport of solvents of this ionically conductive layer may be obtained from a variety of ionically conductive layers as, for example, by crosslinking by heat, radiation, or use as a crosslinking agent a high molecular weight, ionically conductive polyether, such as a hydroxyethyl acrylate ester of a methylvinylether-maleic anhydride polymer. These crosslinked polymers may also be capable of absorbing large quantities of typical electrolyte solvents for lithium cells, such as dimethoxyethane and 1,3-dioxolane, to form a gelled barrier to transport of electrolyte liquids through the protective coating layer.

In one embodiment, the first protective coating layer comprises a polymer selected from the group consisting of electrically conductive polymers, ionically conductive polymers, sulfonated polymers, and hydrocarbon polymers. Suitable conductive polymers include, but are not limited to, those described in U.S. Pat. No. 5,648,187 to Skotheim, for example, including, but not limited to, poly(p-phenylene), polyacetylene, poly(phenylenevinylene), polyazulene, poly(perinaphthalene), polyacenes, and poly(naphthalene-2,6-diyl).

In one embodiment, the first protective coating layer comprises an ionically conductive polymer. Suitable ionically conductive polymers include, but are not limited to, ionically conductive polymers known to be useful in solid polymer electrolytes and gel polymer electrolytes for lithium electrochemical cells, such as, for example, polyethylene oxides and polydivinyl-poly(ethylene glycols). In a preferred embodiment, the ionically conductive polymer is a polydivinyl-poly(ethylene glycol).

In one embodiment, the first protective coating layer comprises a sulfonated polymer. Suitable sulfonated polymers include, but are not limited to, sulfonated siloxane polymers, sulfonated polystyrene-ethylene-butylene polymers, and sulfonated polystyrene polymers. In one embodiment, the sulfonated polymer is a sulfonated poystyrene.

In one embodiment, the first protective coating layer comprises a hydrocarbon polymer. Suitable hydrocarbon polymers include, but are not limited to, ethylene-propylene polymers, polystyrene polymers, and the like.

In one embodiment, the first protective coating layer comprises a microporous xerogel layer and, preferably, the microporous xerogel layer comprises an organic polymer. Suitable materials for making the microporous xerogel layer and for the organic polymers to be present in the microporous xerogel layer include, but are not limited to, the materials and organic polymers, as described herein, for use in making the microporous xerogel separator layers of the cathode/separator assemblies of the present invention. Suitable materials for the xerogel layer of the protective coating layer include, but are not limited to, oxides selected from the group consisting of pseudo-boehmite, zirconium oxide, titanium oxide, aluminum oxide, silicon oxide, and tin oxide. In a preferred embodiment, the material of the xerogel layer of the protective coating layer comprises pseudo-boehmite or zirconium oxide, or combinations thereof.

Since the microporous xerogel layer is typically too porous to act as a single ion conducting protective layer or to be impervious to dimethoxyethane and 1,3-dioxolane, and combinations thereof, the protective layer may further comprise barrier materials impregnated in the pores of the xerogel layer to both increase the cycle life of the cell by protecting the lithium against degradation by electrolyte and cathode components and to increase the manufacturability and reliability of the cell by mechanically protecting the separator and cathode layers against cracking and breaking during cell fabrication and usage.

One advantage of using microporous xerogel layers in the first protective coating layer is that the cationic properties of the metal of the oxide, such as $Al^{3+}$, typically have a strong affinity for anions, such as the polysulfides formed during the cathode reduction cycle of lithium-sulfur cells, and may strongly adsorb these anions during the use of the cell. These adsorbed anions will inhibit or block transport of species, other than the extremely small lithium cations which also may have enhanced transport from the adsorbed anions, through the first protective coating layer. Besides the physical blocking from the presence of the adsorbed anions in the ultrafine pores of the xerogel layer having average pore diameters typically in the range of only 1 to 4 microns, the negative charge of the adsorbed anions may also be useful in repelling and preventing more anions from diffusing into the first protective coating layer.

Thus, first protective coating layers comprising a microprous xerogel layer provide a wide variety of options for protecting the cell from degradation of the lithium anode and reduced cycle life and also from mechanical damage during fabrication and usage which might cause short circuiting or other safety-related or capacity-related defects to develop in the cell.

In one embodiment, the protective coating layer comprises a release agent, such as a fluorochemical compound. This is a useful way to provide the proper level of adhesion for the protective coating layer during fabrication while also allowing for easy delamination when it is desired to remove the temporary carrier substrate. This also reduces or eliminates the need to treat the temporary carrier substrate with a release agent and makes it easier to use less expensive substrates with no extra release treatment on their surfaces, such as, for example, polyethylene terephthalate (PET) films that are untreated for release or adhesion on their surfaces. In one embodiment, the release agent of the first protective coating layer comprises a perfluorinated moiety, such as, for example, $CF_3$— and —$CF_2$—.

The first protective coating layer may be a single layer prepared in a single step or prepared in two or more steps, such as, for example, in the two step coating process of coating a microporous xerogel layer and then impregnating the pores of the very thin xerogel layer with a monomer which subsequently is crosslinked to enhance the protective properties for longer cycle life and better mechanical properties and flexibility of the layers in the cell. Also, the first protective coating layer may comprise two or more protective coating layers, which provide cycle life and mechanical protective properties in total, and are applied prior to the application of the microprous separator coating.

In one embodiment, the first protective coating layer comprises an electrically conductive pigment. Suitable electrically conductive pigments include, but are not limited to, carbon blacks and conductive tin oxides. In one embodiment, the first protective coating layer comprises an aromatic hydrocarbon. Suitable aromatic hydrocarbons include, but are not limited to, 9,9'-bianthryl and other dimers of polycyclic aromatic hydrocarbons. These materials, such as 9,9'-bianthryl, may be incorporated into the protective coating layer by the use of a more soluble precursor form, such as 9-hydroxy-10,10-dihydro-9,9'-bianthryl, which is subsequently reacted to form 9,9'-bianthryl during cycling of the cell or by heating or another reaction process.

The term "monomer" is used herein to describe moieties which have a reactive moiety and are capable of reacting to form a polymer. The term "polymer" is used herein to describe molecules that have two or more repeating moieties formed from a monomer moiety. The term "macromonomer" is used herein to describe polymers with molecular weights from several hundreds to tens of thousands with a functional group at a chain end that may be polymerized. In one embodiment, the first protective coating layer and any other protective coating layers of the cathode/separator assembly of the present invention comprise a polymer. In one embodiment, the polymer of the one or more protective coating layers comprises one or more moieties from the polymerization of one or more monomers or macromonomers. Examples of suitable monomers or macromonomers include, but are not limited to, acrylates, methacrylates, olefins, epoxides, and vinyl ethers. Further examples of suitable monomers or macromonomers for forming the polymer of the protective coating layer include, but are not limited to, those described in U.S. patent application Ser. No. 09/215,029 by Ying et al. of the common assignee, the disclosure of which is fully incorporated herein by reference.

The molecular weight of the polymer of the one or more protective coating layers is preferably greater than 10,000. More preferred is a polymer of molecular weight greater than 50,000.

The thickness of the one or more protective coating layers of the cathode/separator assembly of the methods of this invention may vary over a wide range from about 0.01 microns to about 20 microns. In a preferred embodiment, the protective coating layer has a thickness of from about 0.01 microns to about 10 microns. More preferred is a thickness of from about 0.05 microns to about 5 microns, and even more preferred is a thickness of from about 0.1 microns to about 2 microns, especially when multiple protective coating layers are present. Conventional separators, such as polyolefin materials, are typically 25 to 50 microns in thickness so it is particularly advantageous that the protective coating layers combined with microporous separator layers of the methods of this invention can be effective and inexpensive at overall thicknesses below 15 microns. In other words, it is preferable that the combined thickness of the one or more microporous layers, such as microporous xerogel layers, and the one or more protective coating layers be below 15 microns.

The one or more protective coating layers comprising a polymer of the cathode/separator assembly of the methods of this invention may comprise a pigment. Suitable pigments for use in the one or more protective coating layers include, but are not limited to, colloidal silicas, amorphous silicas, surface treated silicas, colloidal aluminas, amorphous aluminas, conductive carbons, conductive tin oxides, titanium oxides, and polyethylene beads.

The weight ratio of the polymer to the pigment in the one or more protective coating layers may vary from about 1:10 to about 10:1. In a preferred embodiment, the polymer and the pigment are present in the one or more protective coating layers at a weight ratio of from about 1:4 to about 6:1. In a more preferred embodiment, the polymer and the pigment are present in the one or more protective coating layers at a weight ratio of from about 1:3 to about 4:1.

The particle size or diameter of the pigment is preferably larger than the average pore diameter of the one or more microporous layers of the separator layer so that the pigment does not penetrate pores of the microporous separator layer, in those cases where the protective coating layer comprises a pigment and is coated directly onto a microporous separator layer. The particle size of the pigment may range from about 10 nm to about 10,000 nm. In a preferred embodiment, the pigment has a particle size from about 20 nm to about 6,000 nm. In a most preferred embodiment, the pigment has a particle size from about 50 nm to about 3,000 nm.

In addition to polymers and pigments, the one or more protective coating layers of the cathode/separator assembly of the methods of the present invention may comprise other additives, as known in the art of coatings, especially those known for use in flexible and durable coatings. Examples of other coating additives include, but are not limited to, photosensitizers for radiation curing of any monomers and macromonomers present; catalysts for non-radiation curing of any monomers, macromonomers, or polymers present; crosslinking agents such as zirconium compounds, aziridines, and isocyanates; surfactants; plasticizers; dispersants; flow control additives; and rheology modifiers.

Figure 2:
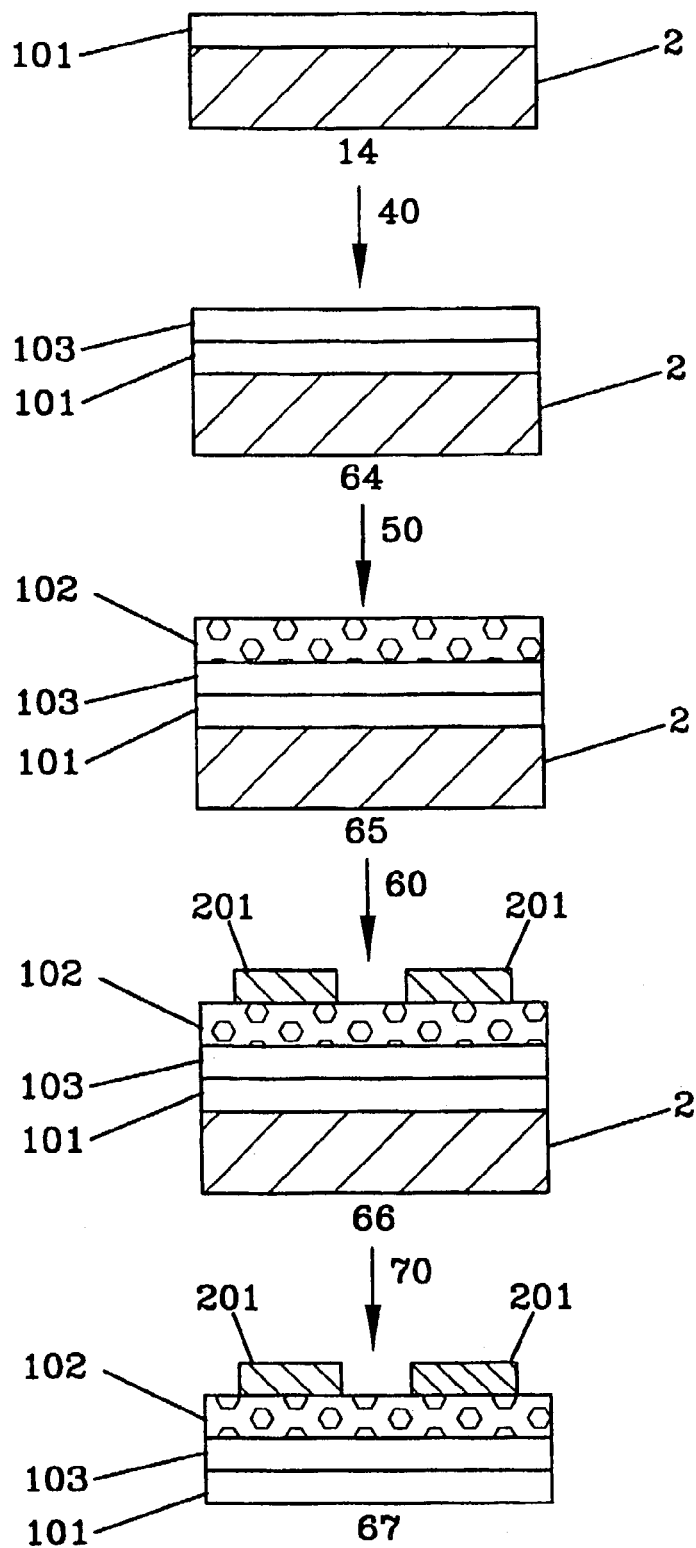
FIG. 2 shows a representative process flow diagram with cross-sectional views of one embodiment of the methods of preparing a cathode/separator assembly of the present invention, which comprises a protective coating step 40, a microporous separator coating step 50, a cathode active layer coating step 60, and a temporary carrier substrate removing step 70.
Figure 3:
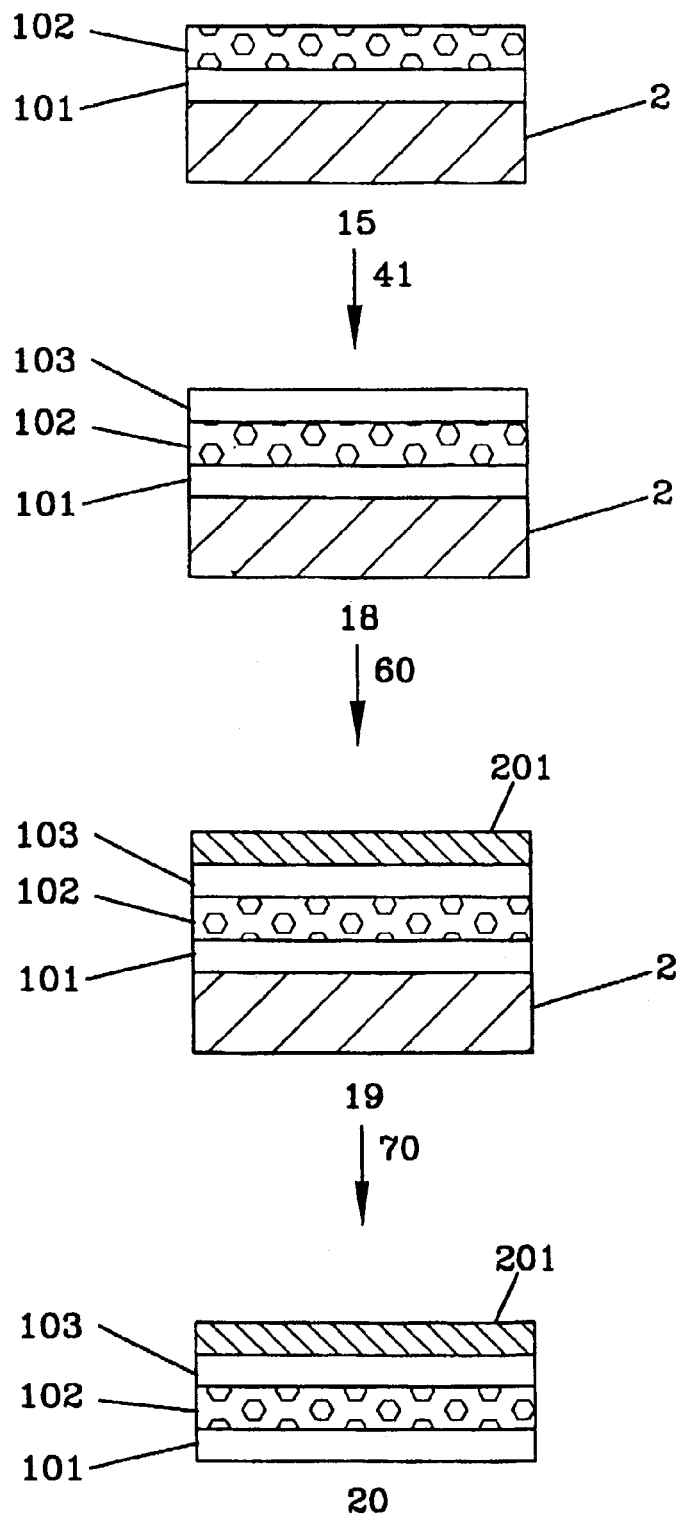
FIG. 3 shows a representative process flow diagram with cross-sectional views of one embodiment of the methods of preparing a cathode/separator assembly of this invention, which further comprises a protective coating layer step 41 prior to the cathode active layer coating step 60, in comparison to the embodiment illustrated in FIG. 1.

The microporous separator layer of the cathode/separator assembly of the methods of the present invention may have more than one microporous layer. Also, the cathode/separator assembly of the methods of the present invention may have more than one protective coating layer, for example, as illustrated in FIGS. 2 and 3. The compositions of these multiple microporous layers of the separator layer may be the same or different for each such layer in the cathode/separator assembly. Also, the compositions of these multiple protective coating layers may be the same or different for each such layer in the cathode/separator assembly. The many possible combinations of microporous layers and protective coating layers also include a protective coating layer intermediate between two microporous layers.

The term "electrochemical cell," as used herein, pertains to a device that produces an electric current through an electrochemical reaction and that comprises a positive electrode or cathode, a negative electrode or anode, and an electrolyte element interposed between the anode and the cathode, wherein the electrolyte element comprises a separator layer and an aqueous or non-aqueous electrolyte in the pores of the separator layer.

The term "cathode active material," as used herein, pertains to an electrochemically active material used in the cathode active layer of the cathode. As used herein, the term "cathode active layer" pertains to any layer in the cathode of an electrochemical cell which comprises a cathode active material.

The term "anode active material," as used herein, pertains to an electrochemically active material used in the anode active layer of the anode. As used herein, the term "anode active layer" pertains to any layer in the anode of an electrochemical cell which comprises an anode active material.

An electrochemical cell comprising a cathode active layer with the cathode active material in an oxidized state and an anode active layer with the anode active material in a reduced state is referred to as being in a charged state. Discharging an electrochemical cell in its charged state by allowing electrons to flow from the anode to the cathode through an external circuit results in the electrochemical reduction of cathode active material in the cathode and the electrochemical oxidation of anode active material in the anode. To facilitate the efficient flow of electrons through this external circuit, an electrically conductive current collector layer may be placed in contact with the surface of each electrode on the side opposite to the electrolyte element. The term "cathode current collector layer," as used herein, pertains to an electrically conductive current collector layer in contact with the cathode active layer. The term "cathode," as used herein, pertains to the combination of the cathode active layer and the cathode current collector layer. The term "anode current collector layer," as used herein, pertains to an electrically conductive current collector layer in contact with the anode active layer. The term "anode," as used herein, pertains to the anode active layer and also to the anode current collector layer, if one is present. These current collectors are useful in efficiently collecting the electrical current generated throughout the respective electrodes and in providing an efficient surface for attachment of the electrical contacts leading to the external circuit.

The term "microporous" as used herein, pertains to the material of a layer, which material possesses pores of diameter of about 1 micron or less which are interconnected in a substantially continuous fashion from one outermost surface of the layer through to the other outermost surface of the layer. The term "microporous separator layer" is used herein to describe a separator layer, which layer may comprise one or more discrete coating layers, where the separator layer as a whole is microporous. Examples of microporous materials useful in the microporous separator layer of the methods of the present invention include, but are not limited to, inorganic xerogel layers or films, inorganic xerogel layers or films further comprising an organic polymer, and organic polymer layers or films that undergo vesiculation or pore formation upon gas formation, for example, by heating or photoirradiating an aromatic diazonium compound or other gas forming compound or by heating a polymeric microcapsule containing a gas, such as isobutane.

In one embodiment of the methods of preparing a cathode/separator assembly of this invention, the microporous separator layer comprises one or more microporous xerogel layers. By the terms "xerogel layer" and "xerogel structure," as used herein, is meant, respectively, a layer of a coating or the structure of a coating layer in which the layer and structure were formed by drying a liquid sol or sol-gel mixture to form a solid gel matrix as, for example, described in Chem. Mater., Vol. 9, pages 1296 to 1298 (1997) by Ichinose et al. for coating layers of metal-oxide based xerogels. Thus, if the liquid of the gel formed in the liquid sol-gel mixture is removed substantially, for example, though formation of a liquid-vapor boundary phase, the resulting gel layer or film is termed, as used herein, a xerogel layer. As the liquid is removed from the gel in the liquid sol-gel mixture by, for example, evaporation, large capillary forces are exerted on the pores, forming a collapsed structure for the xerogel layer. The pore sizes of the xerogel layer and structure are very small, having average pore diameters less than 300 nm or 0.3 microns.

Thus, the microporous xerogel layer of the methods of this invention comprises a dried microporous three-dimensional solid gel network in a substantially continuous fashion from one outermost surface of the layer through to the other outermost surface of the layer. A continuous xerogel coating layer has the materials of the xerogel in a continuous structure in the coating layer, i.e., the materials are in contact and do not have discontinuities in the structure, such as a discontinuous layer of solid pigment particles that are separated from each other, for example, by a polymer binder between the individual pigment particles. In contrast, xerogel pigment particles may be formed by a xerogel process involving drying a liquid solution of a suitable precursor to the pigment in order to form a dried mass of xerogel pigment particles, which is typically then ground to a fine powder to provide porous xerogel pigment particles.

The terms "xerogel coating" and "xerogel coating layer," as used herein, are synonymous with the term "xerogel layer".

The term "binder," as used herein, pertains to inorganic or organic materials which form a continuous structure or film in a substantially continuous fashion from one outermost surface of a coating layer through to the other outermost surface of the coating layer. As such, for example, the xerogel, such as pseudo-boehmite or other metal oxide xerogel, of a xerogel layer is also a binder in addition to having a xerogel structure with ultrafine pores.

A wide variety of materials known to form microporous xerogel layers when coated on a surface may be used to provide the microporous xerogel layers of the separator layers for the methods of the present invention. The electrical conductivity of the microporous separator layer of the methods of the present invention must be low enough to provide the necessary insulating properties for the separator component when used in an electrochemical cell. Thus, for example, a highly electrically conductive material, such as some vanadium oxides, that may form microporous xerogel layers when coated from a sol-gel liquid mixture of a suitable precursor onto a surface may not be suitable in the methods of preparing a cathode/separator assembly of this invention. Suitable materials for use in the microporous xerogel layers of the cathode/separator assembly of the methods of the present invention include, but are not limited to, pseudo-boehmites, zirconium oxides, titanium oxides, aluminum oxides, silicon oxides, and tin oxides.

In a preferred embodiment of the methods of preparing a cathode/separator assembly of this invention, the separator layer comprises one or more microporous pseudo-boehmite layers. Microporous pseudo-boehmite layers for use as separators in electrochemical cells are described in copending U.S. patent application Ser. Nos. 08/995,089 and 09/215, 112, both to Carlson et al. of the common assignee, the disclosures of which are fully incorporated herein by reference. The term "pseudo-boehmite," as used herein, pertains to hydrated aluminum oxides having the chemical formula $Al_2O_3 \cdot xH_2O$ wherein x is in the range of from 1.0 to 1.5. Terms, as used herein, which are synonymous with "pseudo-boehmite," include "boehmite," "AlOOH," and "hydrated alumina." The materials referred to herein as "pseudo-boehmite" are distinct from anhydrous aluminas ($Al_2O_3$, such as alpha-alumina and gamma-alumina), and hydrated aluminum oxides of the formula $Al_2O_3 \cdot xH_2O$ wherein x is less than 1.0 or greater than 1.5.

The amount of the pores in a microporous layer may be characterized by the pore volume, which is the volume in cubic centimeters of pores per unit weight of the layer. The pore volume may be measured by filling the pores with a liquid having a known density and then calculated by the increase in weight of the layer with the liquid present divided by the known density of the liquid and then dividing this quotient by the weight of the layer with no liquid present, according to the equation:

$$\text{Pore Volume} = \frac{[W_1 - W_2]/d}{W_2}$$

where $W_1$ is the weight of the layer when the pores are completely filled with the liquid of known density, $W_2$ is the weight of the layer with no liquid present in the pores, and d is the density of the liquid used to fill the pores. Also, the pore volume may be estimated from the apparent density of the layer by subtracting the reciprocal of the theoretical density of the materials (assuming no pores) comprising the microporous layer from the reciprocal of the apparent density or measured density of the actual microporous layer, according to the equation:

$$\text{Pore Volume} = \left(\frac{1}{d_1} - \frac{1}{d_2}\right)$$

where $d_1$ is the density of the layer which is determined from the quotient of the weight of the layer and the layer volume as determined from the measurements of the dimensions of the layer, and $d_2$ is the calculated density of the materials in the layer assuming no pores are present or, in other words, $d_2$ is the density of the solid part of the layer as calculated from the densities and the relative amounts of the different materials in the layer. The porosity or void volume of the layer, expressed as percent by volume, can be determined according to the equation:

$$\text{Porosity} = \frac{100 \text{ (Pore Volume)}}{[\text{Pore Volume} + 1/d_2]}$$

where pore volume is as determined above, and $d_2$ is the calculated density of the solid part of the layer, as described above.

In one embodiment, the microporous xerogel layer of the microporous separator layer of the methods of the present invention has a pore volume from 0.02 to 2.0 cm³/g. In a preferred embodiment, the microporous xerogel layer has a pore volume from 0.3 to 1.0 cm³/g. In a more preferred embodiment, the microporous xerogel layer has a pore volume from 0.4 to 0.7 cm³/g. Below a pore volume of 0.02 cm³/g, the transport of ionic species is inhibited by the reduced pore volume. Above a pore volume of 2.0 cm³/g, the amount of voids are greater which reduces the mechanical strength of the microporous xerogel layer.

In contrast to conventional microporous separators which typically have pore diameters on the order of 0.03 to 2 microns, the microporous xerogel layers of the microporous separator layer of the methods of the present invention have pore diameters which range from about 0.3 microns down to less than 0.002 microns. In one embodiment, the microporous xerogel layer has an average pore diameter from 0.001 microns or 1 nm to 0.3 microns or 300 nm. In a preferred embodiment, the microporous xerogel layer has an average pore diameter from 0.001 microns or 1 nm to 0.030 microns or 30 nm. In a more preferred embodiment, the microporous xerogel layer has an average pore diameter from 0.003 microns or 3 nm to 0.010 microns or 10 nm.

One distinct advantage of separators with much smaller pore diameters on the order of 0.001 to 0.03 microns is that insoluble particles, even colloidal particles with diameters on the order of 0.05 to 1.0 microns, can not pass through the separator because of the ultrafine pores. In contrast, colloidal particles, such as conductive carbon powders often incorporated into cathode active layer compositions, may readily pass through conventional separators, such as microporous polyolefins, and thereby may migrate to undesired areas of the cell.

Another significant advantage of the microporous separator layer comprising a microporous xerogel layer of the methods of the present invention, in comparison to conventional separators, is that the nanoporous structure of the xerogel layer may function as an ultrafiltration membrane and, in addition to blocking all particles and insoluble materials, may block or significantly inhibit the diffusion of soluble materials of relatively low molecular weights, such as 2,000 or higher, while permitting the diffusion of soluble materials with molecular weights below this cutoff level. This property may be utilized to advantage in coating the cathode active layer and other layers onto the surface of the separator layer by preventing any undesired penetration of pigments and other materials into the separator layer. This property may also be utilized to advantage in selectively impregnating or imbibing materials into the separator layer during manufacture of the electrochemical cell or in selectively permitting diffusion of very low molecular weight materials through the separator layer during all phases of the operation of the cell while blocking or significantly inhibiting the diffusion of insoluble materials or of soluble materials of medium and higher molecular weights.

Another important advantage of the extremely small pore diameters of the microporous xerogel layer of the separator layer of the methods of the present invention is the strong capillary action of the tiny pores in the xerogel layer which enhances the capability of the microporous separators to readily take up or imbibe electrolyte liquids and to retain these materials in pores within the separator layer.

The microporous separator layers of the methods of this invention may optionally further comprise a variety of binders (in addition to the binder, such as for example a pseudo-boehmite xerogel, that provides the primary microporous structure of the separator layer), to improve the mechanical strength and other properties of the layer, as for example, described for microporous pseudo-boehmite xerogel layers in the two aforementioned copending U.S. patent application Ser. Nos. 08/995,089 and 09/215,112, both to Carlson et al. of the common assignee. Any binder that is compatible with the microporous material of the separator layer may be used. For microporous xerogel layers, any binder that is compatible with the xerogel precursor sol during mixing and processing into the microporous xerogel layer and provides the desired mechanical strength and uniformity of the layer without significantly interfering with the desired microporosity is suitable for use. The preferred amount of binder is from 5% to 70% of the weight of the xerogel-forming material in the layer. Below 5 weight percent, the amount of binder is usually too low to provide a significant increase in mechanical strength. Above 70 weight percent, the amount of binder is usually too high and fills the pores to an excessive extent, which may interfere with the microporous properties and with the transport of low molecular weight materials through the layer. The binder may be inorganic, for example, another xerogel-forming material, such as silicas, gamma aluminum oxides, and alpha aluminum oxides, that are known to be compatible with the primary xerogel-forming material, such as pseudo-boehmite, present in the microporous layer, for example, as is known in the art of ink-receptive microporous xerogel layers for ink jet printing. In one embodiment, the binders in the microporous xerogel layer are organic polymer binders. Examples of suitable binders include, but are not limited to, polyvinyl alcohols, cellulosics, polyvinyl butyrals, urethanes, polyethylene oxides, copolymers thereof, and mixtures thereof. Binders may be water soluble polymers and may have ionically conductive properties. Suitable binders may also comprise plasticizer components such as, but not limited to, low molecular weight polyols, polyalkylene glycols, and methyl ethers of polyalkylene glycols to enhance the coating, drying, and flexibility of the microporous xerogel layer. These plasticizer components may be selected to also provide useful properties as a component of the electrolyte.

The thickness of the microporous separator layer of the methods of the present invention may vary over a wide range since the basic properties of microporosity and mechanical integrity are present in layers of a few microns in thickness as well as in layers with thicknesses of hundreds of microns. The microporous separator layer may be coated in a single coating application or in multiple coating applications to provide the desired overall thickness. For various reasons, including cost, overall performance properties of the microporous separator layer, and ease of manufacturing, the desirable overall thicknesses of the microporous separator layer are in the range of 1 micron to 25 microns. Preferred are thicknesses in the range of 1 micron to 20 microns. More preferred are thicknesses in the range of 5 to 15 microns. Conventional separators, such as the porous polyolefin materials, are typically 25 to 50 microns in thickness so it is particularly advantageous that the microporous separator layers of this invention can be effective and inexpensive at thicknesses below 15 microns.

In the methods of preparing a cathode/separator assembly of the present invention, the temporary carrier substrate functions as a temporary support to the superposed layers during the process steps of this invention and may be any web or sheet material possessing suitable smoothness, flexibility, dimensional stability, and adherence properties to the cathode/separator assembly. In one embodiment of the methods of preparing a cathode/separator assembly of the present invention, the temporary carrier substrate is a flexible web substrate. Suitable web substrates include, but are not limited to, papers, polymeric films, and metals. A typical flexible polymeric film for use as the temporary carrier substrate is a polyethylene terephthalate film. In a preferred embodiment, the flexible web substrate is surface treated with a release agent to enhance desired release characteristics, such as by treatment with a silicone release agent and the like. This surface treatment or coating with a release agent of the temporary carrier substrate may be done on a multistation coating machine in the same coating pass as that used to later apply the first layer of the cathode/separator assembly in the methods of this invention. Thus for example, referring to FIG. 1, in one embodiment of the methods of the present invention, the coating step of coating the temporary carrier substrate with a release agent would occur prior to the protective coating step 40. Examples of suitable flexible web substrates include, but are not limited to, resin-coated papers such as papers on which a polymer of an olefin containing 2 to 10 carbon atoms, such as polyethylene, is coated or laminated; and transparent or opaque polymeric films such as polyesters, polypropylene, polystyrene, polycarbonates, polyvinyl chloride, polyvinyl fluoride, polyacrylates, and cellulose acetate.

The temporary carrier substrate may be of a variety of thicknesses, such as, for example, thicknesses in the range of 2 to 100 microns. Since the temporary carrier substrate is subsequently removed from the cathode/separator assembly and is not present in the electrochemical cell comprising the cathode/separator assembly, the temporary carrier substrate may be thicker than the 2 to 3 micron thickness for an electrochemically inactive substrate of the electrodes which is normally desired to maximize the amount of electroactive materials in the cell. Thus, one benefit of the methods of this invention is the capability of coating the separator layer and the cathode active layer on a relatively thick substrate, such as a 12 to 25 micron thick polyethylene terephthalate film, instead of being limited to a 2 or 3 micron substrate, or even a 6 micron substrate. Thinner substrates of 6 microns or less are more difficult to coat and dry for mechanical handling and dimensional stability reasons, especially with relatively thick separator layer and cathode active layer is coatings which often are coated from water or other high-boiling liquids.

Another benefit is that the temporary carrier substrate, after its removal from the cathode/separator assembly, may be reused for preparing another cathode/separator assembly, may be reused for another product application, or may be reclaimed and recycled. Any such reuses combine to lower the effective cost of the temporary carrier substrate in preparing the cathode/separator assembly.

In one embodiment of the methods of preparing a cathode/separator assembly of this invention, the cathode active layer of the cathode comprises an electroactive material selected from the group consisting of electroactive metal chalcogenides, electroactive conductive polymers, and electroactive sulfur-containing materials, and combinations thereof. As used herein, the term "chalcogenides" pertains to compounds that contain one or more of the elements of oxygen, sulfur, and selenium. The cathode active layer of the cathode/separator assembly of the methods of the present invention may be coated in a single coating step, or, alternatively, the cathode active layer may be coated in multiple coating steps to provide the desired overall thickness. The preparation of the cathode active layer may comprise other processing steps as known in the art of cathode active coatings, such as, for example, calendering. The cathode active layer of the cathode/separator assembly of the methods of the present invention may further comprise one or more other non-electroactive components such as polymeric binders, electrically conductive materials, ionically conductive materials, non-electroactive metal oxides, and other additives known in the art of cathode active layers.

The thickness of the cathode active layer may vary widely depending on the type and thickness of the anode active layer and on the type and weight percent of the cathode active material in the cathode active layer. Typical thicknesses are in the range of 5 to 200 microns with the cathode active layer more typically having a thickness of 10 to 30 microns.

Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. Preferred transition metal chalcogenides are the electroactive oxides of nickel, manganese, cobalt, and vanadium. In one embodiment, the cathode active layer comprises an electroactive conductive polymer. Examples of suitable conductive polymers include, but are not limited to, electroactive and electronically conductive polymers selected from the group consisting of polypyrroles, polyanilines, polyphenylenes, polythiophenes, and polyacetylenes. Preferred conductive polymers are polypyrroles, polyanilines, and polyacetylenes.

Preferred cathode active materials are those comprising electroactive sulfur-containing materials. The term "electroactive sulfur-containing material," as used herein, pertains to cathode active materials which comprise the element sulfur in any form, wherein the electrochemical activity involves the breaking or forming of sulfur—sulfur covalent bonds. The nature of the electroactive sulfur-containing materials useful in the cathode active layers of this invention may vary widely. The electroactive properties of elemental sulfur and of other sulfur-containing materials are known in the art, and typically include the reversible formation of lithiated or lithium ion sulfides during the discharge or cathode reduction cycle of the battery.

In one embodiment, the cathode active layer comprises elemental sulfur.

In one embodiment, the cathode active layer comprises an electroactive sulfur-containing material that is organic, that is, it comprises both sulfur atoms and carbon atoms.

In one embodiment, the electroactive sulfur-containing material is polymeric. In one embodiment, the cathode active layer comprises an electroactive sulfur-containing organic polymer, wherein the sulfur-containing organic polymer, in its oxidized state, comprises one or more polysulfide moieties, $S_m$, selected from the group consisting of covalent $—S_m—$ moieties, ionic $—S_m^-$ moieties, and ionic $S_m^{2-}$ moieties, where m is an integer equal to or greater than 3 and is the same or different at each occurrence, as, for example, described in copending U.S. Provisional Pat. Appl. Ser. Nos. 60/132,348 and 60/132,393 to Movchan et al. and Kovalev et al., respectively, of the common assignee, the disclosures of which are fully incorporated herein by reference. In a discharged state, an electroactive sulfur-containing organic polymer is in an electrochemically reduced state and, when polysulfide moieties are present in the polymer, the polymer typically forms ionic organic polysulfides and sulfides along with some inorganic polysulfides and sulfides during discharge. The microporous xerogel layers, such as pseudo-boehmite xerogel layers, may be beneficial in controlling the concentration of these ionic species and their diffusion to the anode as, for example, described in copending U.S. patent application Ser. No. 08/995,089 to Carlson et al. of the common assignee. In one embodiment, m of the polysulfide moiety, $S_m$, of the sulfur-containing organic polymer is an integer equal to or greater than 9 and is the same or different at each occurrence. In one embodiment, m of the polysulfide moiety, $S_m$, of the sulfur-containing organic polymer is an integer equal to or greater than 24 and is the same or different at each occurrence. In one embodiment, the polysulfide moiety, $S_m$, is covalently bonded by one or both of its terminal sulfur atoms as a side group on the polymer backbone chain of the sulfur-containing organic polymer. In one embodiment, the polysulfide moiety, $S_m$, comprises a covalent $—S_m—$ moiety, which covalent $—S_m—$ moiety is incorporated by covalent bonds to both of its terminal sulfur atoms into the polymer backbone chain of the sulfur-containing organic polymer.

Examples of electroactive sulfur-containing organic polymers include, but are not limited to, those comprising one or more carbon-sulfur polymers of general formulae $(CS_x)_n$ and $(C_2S_z)_n$. Compositions comprising the general formula $—(CS_x)_n—$ (formula I), wherein x ranges from 1.2 to 2.3, and n is an integer equal to or greater than 2, are described in U.S. Pat. No. 5,441,831 to Okamoto et al. Additional examples include those wherein x ranges from greater than 2.3 to about 50, and n is equal to or greater than 2, as described in U.S. Pat. Nos. 5,601,947 and 5,690,702 to Skotheim et al. Additional examples of electroactive sulfur-containing polymers include those compositions comprising the general formula $—(C_2S_z)_n—$ (formula II) wherein z ranges from greater than 1 to about 100, and n is equal to or greater than 2, as described in U.S. Pat. Nos. 5,529,860 and 6,117,590, both to Skotheim et al. of the common assignee. The preferred materials of general formulae I and II, in their oxidized states, comprise a polysulfide moiety of the formula, $—S_m—$, wherein m is an integer equal to or greater than 3 and is the same or different at each occurrence.

The backbone of electroactive sulfur-containing polymers may comprise polysulfide $—S_m—$ main chain linkages along with the presence of covalently bound $—S_m—$ side groups. Owing to the presence of multiple linked sulfur atoms, $—S_m—$, where m is an integer equal to or greater than 3, in these materials, they possess significantly higher energy densities than corresponding materials containing disulfide linkages, $—S—S—$, alone.

Other preferred electroactive sulfur-containing polymers are those comprising carbocyclic repeat groups, as described in copending U.S. patent application Ser. No. 08/995,122 to Gorkovenko et al. of the common assignee.

Other examples of electroactive sulfur-containing polymers comprising a polysulfide moiety, Sm, where m is an integer that is equal to or greater than 3, are one-dimensional electron conducting polymers containing at least one polysulfurated chain forming a charge transfer complex with the polymer, as described in U.S. Pat. No. 4,664,991 to Perichaud et al.

Other examples of electroactive sulfur-containing polymers include organo-sulfur materials comprising disulfide linkages, although their low specific capacity compared to the corresponding materials containing polysulfide linkages makes it difficult to achieve the desired high capacities in electrochemical cells. However, they may also be utilized in a blend in the cathode active layer with elemental sulfur and/or with sulfur-containing polymers comprising one or more polysulfide moieties and may contribute by their electrochemical properties, their chemical interactions with lithium polysulfides and lithium sulfides generated during cycling of the cells, and, optionally, their melting properties during fabrication of the cathode, to achieving the desired high capacities in electrochemical cells. Examples of electroactive sulfur-containing materials comprising disulfide groups include those described in U.S. Pat. No. 4,739,018 to Armand et al.; U.S. Pat. Nos. 4,833,048 and 4,917,974, both to DeJonghe et al.; U.S. Pat. Nos. 5,162,175 and 5,516,598, both to Visco et al.; and U.S. Pat. No. 5,324,599 to Oyama et al.

The relative amounts of electroactive cathode active material, such as sulfur-containing organic polymer, and other components such as conductive additives, polymeric binders, electrolytes, and other additives in the cathode active layer may vary widely. Generally these relative amounts are determined by experimentation and chosen so as to optimize the amount of cathode active material present, the energy storage capacity of the cathode active layer, and the electrochemical performance of the cathode active layer in an electrochemical cell.

Electroactive sulfur-containing organic polymers for the cathode active layers of the methods of the present invention typically have elemental compositions containing between about 45 weight percent and 98 weight percent of sulfur. In one embodiment, the sulfur-containing organic polymer comprises greater than 75 weight percent of sulfur, and, preferably, greater than 86 weight percent of sulfur, and, most preferably, greater than 90 weight percent of sulfur.

Another embodiment of the methods of preparing a cathode/separator assembly of the present invention is illustrated in FIG. 2. Referring to FIG. 2 (not drawn to scale), in a protective layer coating step 40, a second protective coating layer 103 is coated onto the outer surface of a first protective coating layer 101 of composite 14 comprising protective coating layer 101 and temporary carrier substrate 2, which composite 14 may be prepared by the method illustrated in FIG. 1. This step 40 forms composite 64 comprising temporary carrier substrate 2, first protective coating layer 101, and second protective coating layer 103. Next, in a microporous separator coating step 50, a microporous separator layer 102 is coated onto the surface of the second protective coating layer 103 to form composite 65 comprising temporary carrier substrate 2, first protective coating layer 101, second protective coating layer 103, and microporous separator layer 102. Next, in a cathode active layer coating step 60, a cathode active layer 201 is coated in a desired pattern onto the surface of the microporous separator layer 102 to form composite 66 comprising temporary carrier substrate 2, first protective coating layer 101, second protective coating layer 103, microporous separator layer 102, and cathode active layer 201. Following this step, in a temporary carrier substrate removing step 70, the temporary carrier substrate 2 is removed from the first protective coating layer 101 of composite 66 to form cathode/separator assembly 67 comprising first protective coating layer 101, second protective coating layer 103, microporous separator layer 102, and cathode active layer 201.

In another embodiment of the methods of preparing a cathode/separator assembly of the present invention, a first protective coating layer of the one or more protective coating layers of the cathode/separator assembly is coated directly on the temporary carrier substrate, one of the one or more microporous layers of the separator layer is coated directly on this first protective coating layer, and a second protective coating layer of the one or more protective coating layers of the cathode/separator assembly is coated directly on this microporous layer, as illustrated in FIG. 3. Referring to FIG. 3 (not drawn to scale), in a protective layer coating step 41, a second protective coating layer 103 is coated onto the outer surface of the microporous separator layer 102 of composite 15 comprising microporous separator layer 102, first protective coating layer 101, and temporary carrier substrate 2, which composite 15 may be prepared by the method illustrated in FIG. 1. This step 41 forms composite 18 comprising second protective coating layer 103, microporous separator layer 102, first protective coating layer 101, and temporary carrier substrate 2. Next, in a cathode active layer coating step 60, a cathode active layer 201 is coated in a desired pattern onto the outer surface of the second protective coating layer 103 to form composite 19 comprising cathode active layer 201, second protective coating layer 103, microporous separator layer 102, first protective coating layer 101, and temporary carrier substrate 2. Following this, in a temporary carrier substrate removing step 70, the temporary carrier substrate 2 is removed from the first protective coating layer 101 of composite 19 to form cathode/separator assembly 20 comprising cathode active layer 201, second protective coating layer 103, microporous separator layer 102, and first protective coating layer 101.

The second protective coating layers of the methods of the present invention may comprise the same materials and layers as described herein for the first protective coating layers of the methods of this invention. In one embodiment, the second protective coating layer is a single ion conducting layer. In one embodiment, the second protective coating layer is an ionically conductive layer which is impervious to dimethoxyethane and 1,3-dioxolane and combinations thereof.

In a preferred embodiment of the methods of preparing a cathode/separator assembly of the present invention, the microporous separator layer comprises one or more microporous pseudo-boehmite xerogel layers, and more preferably, the cathode/separator assembly further comprises a second protective coating layer, wherein the second protective coating layer is in contact with at least one of the one or more microporous pseudo-boehmite xerogel layers.

The incorporation of one or more protective coating layers in the cathode/separator assembly of the methods of this invention enhances the mechanical strength and adds flexibility to microporous separator layers comprising one or more microporous layers, particularly those separator layers comprising one or more microporous xerogel layers.

In one embodiment of the methods of preparing a cathode/separator assembly of the present invention, the desired pattern for coating the cathode active layer over the surface of the microporous separator layer may be full coverage of the cathode active layer over the surface of the separator layer or, alternatively, the cathode active layer may not completely coat the surface of the separator layer. In one embodiment, the desired coating pattern of the cathode active layer completely coats the surface of the separator layer directly or indirectly, for example, as illustrated in FIG. 3, where cathode active layer 201 completely coats the surface of protective coating layer 103 which in turn completely coats the surface of microporous separator 102, thus providing indirect complete coverage of the cathode active layer over the surface of the separator layer. In one embodiment, the desired coating pattern of the cathode active layer does not completely coat the surface of the separator layer directly or indirectly, for example, as illustrated in FIGS. 1, 2, 4 to 6, 7A, 7B, 8A, 8B, and 9 to 11. This absence of full coverage of the cathode active layer directly over the surface of the microporous separator layer or, alternatively, indirectly over the surface of a protective coating layer over the microporous separator layer may be beneficial to allow the coating of edge insulating layers in desired patterns on the separator layer and in contact with a portion of the cathode active layer to reduce the possibility of short-circuiting of the electrodes when fabricated into an electrochemical cell. This is also typically consistent with cutting or slitting or otherwise converting the cathode/separator assembly, as originally coated, to a smaller size or dimension for fabrication into an electrochemical cell, for example, as illustrated in FIGS. 4, 7A, 7B, 8A, 8B, and 9 to 11.

Figure 4:
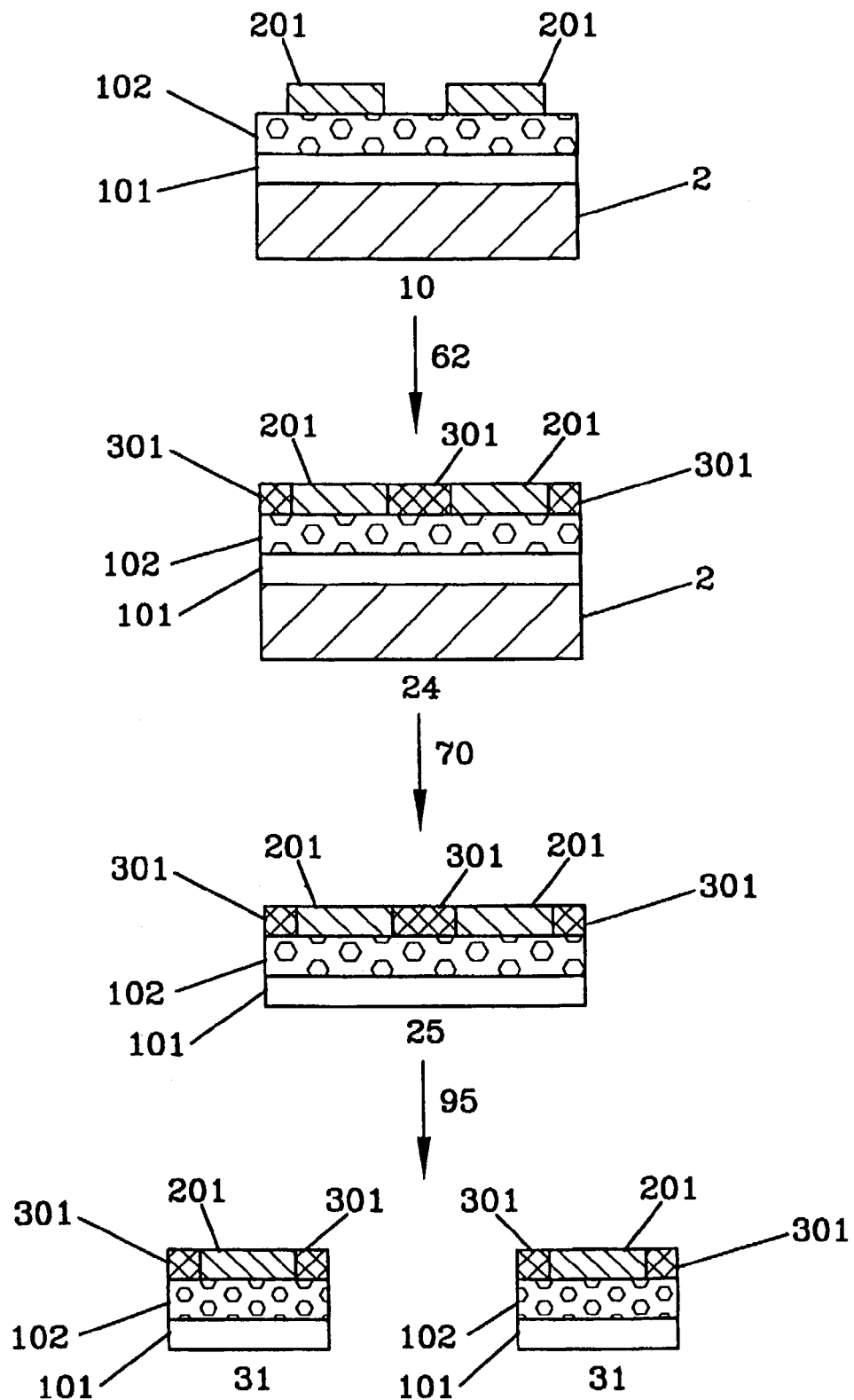
FIG. 4 shows a representative process flow diagram with cross-sectional views of one embodiment of the methods of preparing a cathode/separator assembly of the present invention, which further comprises an edge insulating layer coating step 62 subsequent to the cathode active layer coating step 60 and also comprises a slitting step 95 subsequent to the temporary carrier substrate removal step 70, in comparison to the embodiment illustrated in FIG. 1.

In one embodiment of the methods of preparing a cathode/separator assembly of the present invention, the methods further comprise the step of coating an edge insulating layer in a desired pattern on the surface of the microporous separator layer. In one embodiment, the step of coating the edge insulating layer occurs subsequent to the first protective layer, microporous separator, and the cathode active layer coating steps, and prior to the temporary carrier substrate removing step, for example, as illustrated in FIG. 4. Referring to FIG. 4 (not drawn to scale), in an edge insulating layer coating step 62, an edge insulating layer 301 is coated onto the outer surface of the microporous separator layer 102 of composite 10 comprising cathode active layer 201, microporous separator layer 102, first protective coating layer 101, and temporary carrier substrate 2, which composite 10 may be prepared by the method illustrated in FIG. 1. This forms composite 24 comprising cathode active layer 201, edge insulating layer 301, microporous separator layer 102, first protective coating layer 101, and temporary carrier substrate 2.

Next, in a temporary carrier substrate removing step 70, the temporary carrier substrate 2 is removed from the first protective coating layer 101 of composite 24 to form cathode/separator assembly 25 comprising cathode active layer 201, edge insulating layer 301, microporous separator layer 102, and first protective coating layer 101. If a smaller dimension is desired for the cathode/separator assembly 25, it may be slit or cut or otherwise converted to the desired smaller dimension in a slitting step 95 to form multiples of cathode/separator assembly 31 comprising cathode active layer 201, edge insulating layer 301, microporous separator layer 102, and first protective coating layer 101.

In one embodiment, the desired pattern of the edge insulating layer comprises substantially the remaining area of the surface of the microporous separator layer that is not coated with the desired pattern of the cathode active layer, for example, as illustrated in FIG. 4.

Figure 5:
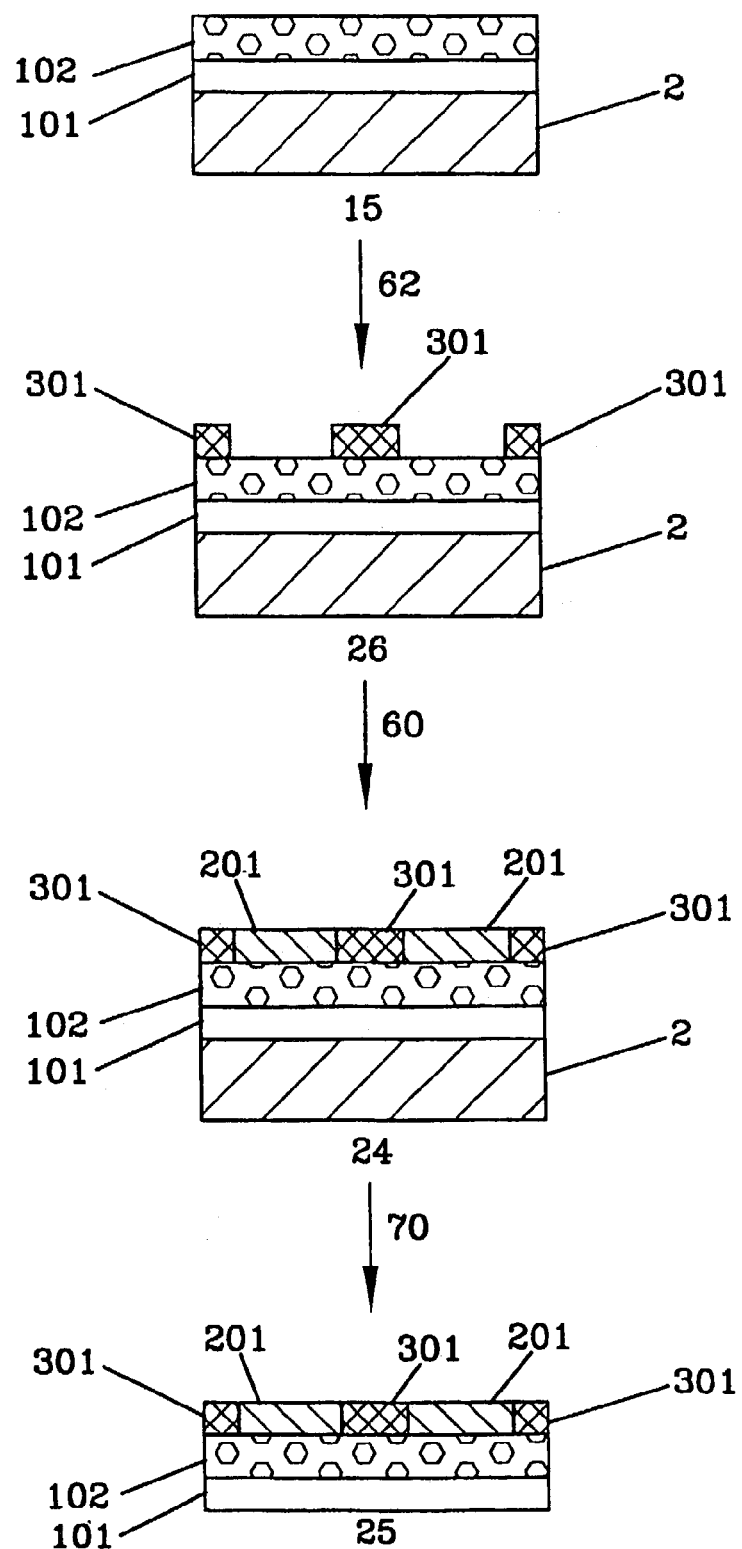
FIG. 5 shows a representative process flow diagram with cross-sectional views of one embodiment of the methods of preparing a cathode/separator assembly of this invention, which further comprises an edge insulating layer coating step 62 prior to the cathode active layer coating step 60, in comparison to the embodiment illustrated in FIG. 1.

In one embodiment, the step of coating the edge insulating layer occurs subsequent to the first protective layer and microporous separator layer coating steps, and prior to the cathode active layer coating step and the temporary carrier substrate removing step, for example, as illustrated in FIG. 5. Referring to FIG. 5 (not drawn to scale), in an edge insulating layer coating step 62, an edge insulating layer 301 is coated in a desired pattern onto the outer surface of the microporous separator layer 102 of composite 15 comprising microporous separator layer 102, first protective coating layer 101, and temporary carrier substrate 2, which composite 15 may be prepared by the method illustrated in FIG. 1. This step 62 forms composite 26 comprising edge insulating layer 301, microporous separator layer 102, first protective coating layer 101, and temporary carrier substrate 2. Next, in a cathode active layer coating step 60, a cathode active layer 201 is coated in a desired pattern onto the surface of the microporous separator layer 102 to form composite 24 comprising cathode active layer 201, edge insulating layer 301, microporous separator layer 102, first protective coating layer 101, and temporary carrier substrate 2. Following this step 60, in a temporary carrier substrate removing step 70, the temporary carrier substrate 2 is removed from the microporous separator layer 102 of composite 24 to form cathode/separator assembly 25 comprising cathode active layer 201, edge insulating layer 301, microporous separator layer 102, and first protective coating layer 101.

In one embodiment, a portion of the desired pattern of the edge insulating layer is in contact with a portion of the desired pattern of the cathode active layer, for example, as illustrated in FIGS. 4 and 5.

In one embodiment, the thickness of the edge insulating layer is substantially the same as the thickness of the cathode active layer, for example, as illustrated in FIGS. 4 and 5.

In one embodiment, the edge insulating layer comprises an insulating xerogel layer such as, for example, a pseudo-boehmite xerogel layer. In one embodiment, the insulating layer comprises an insulating non-porous, polymeric layer. Suitable insulating non-porous, polymeric layers include, but are not limited to, ethylene-propylene coating layers and isocyanate-crosslinked urethane coating layers. In one embodiment, the edge insulating layer is a single ion conducting layer. In one embodiment, the edge insulating layer is an ionically conductive layer which is impervious to dimethoxyethane and 1,3-dioxolane and combination thereof.

Figure 6:
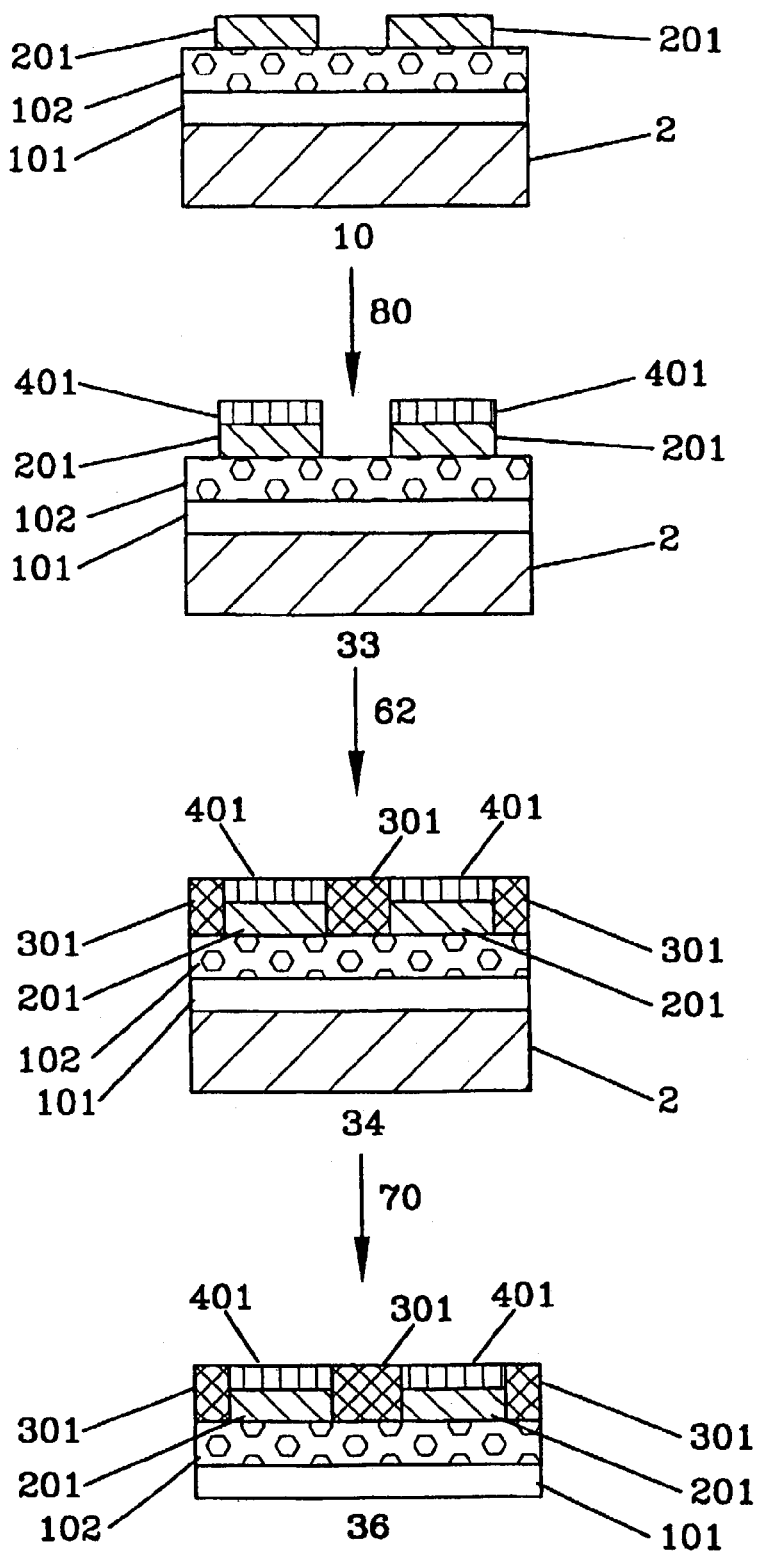
FIG. 6 shows a representative process flow diagram with cross-sectional views of one embodiment of the methods of preparing a cathode/separator assembly of the present invention, which further comprises a cathode current collector layer coating step 80 and an edge insulating layer coating step 62 prior to the temporary carrier substrate removing step 70, in comparison to the embodiment illustrated in FIG. 1.

In one embodiment of the methods of preparing a cathode/separator assembly of the present invention, the methods further comprise the step of depositing a cathode current collector layer in a desired pattern on the outer surface of the cathode active layer, for example, as illustrated in FIG. 6. In one embodiment, the step of depositing the cathode current collector layer occurs subsequent to the first protective layer, microporous separator, and cathode active layer coating steps, prior to the step of coating the edge insulating layer, and prior to the temporary carrier substrate removing step, for example, as illustrated in FIG. 6. Referring to FIG. 6 (not drawn to scale), in a cathode current collector layer coating step 80, a cathode current collector layer 401 is coated in a desired pattern onto the cathode active layer 201 of composite 10 comprising cathode active layer 201, microporous separator layer 102, first protective coating layer 101, and temporary carrier substrate 2, which composite 10 may be formed by the method illustrated in FIG. 1. This step 80 forms composite 33 comprising cathode current collector layer 401, cathode active layer 201, microporous separator layer 102, first protective coating layer 101, and temporary carrier substrate 2. Next, in an edge insulating layer coating step 62, an edge insulating layer 301 in a desired pattern is coated onto the microporous separator layer 102 to form composite 34 comprising cathode current collector layer 401, cathode active layer 201, edge insulating layer 301, microporous separator layer 102, first protective coating layer 101, and temporary carrier substrate 2. Following this, in a temporary carrier substrate removing step 70, the temporary carrier substrate 2 is removed from microporous separator layer 102 of composite 34 to form cathode/separator assembly 36 comprising cathode current collector layer 401, cathode active layer 201, edge insulating layer 301, microporous separator layer 102, and first protective coating layer 101.

Suitable cathode current collector layers include, but are not limited to, coating layers comprising conductive metal pigments, coating layers comprising conductive carbons, coating layers comprising conductive graphites, coating layers comprising conductive polymers, and coating layers comprising conductive metal oxide pigments. Other suitable cathode current collector layers include conductive metal layers such as, for example, an aluminum layer, which may be coated or deposited by a vacuum deposition technique.

Figure 7A:
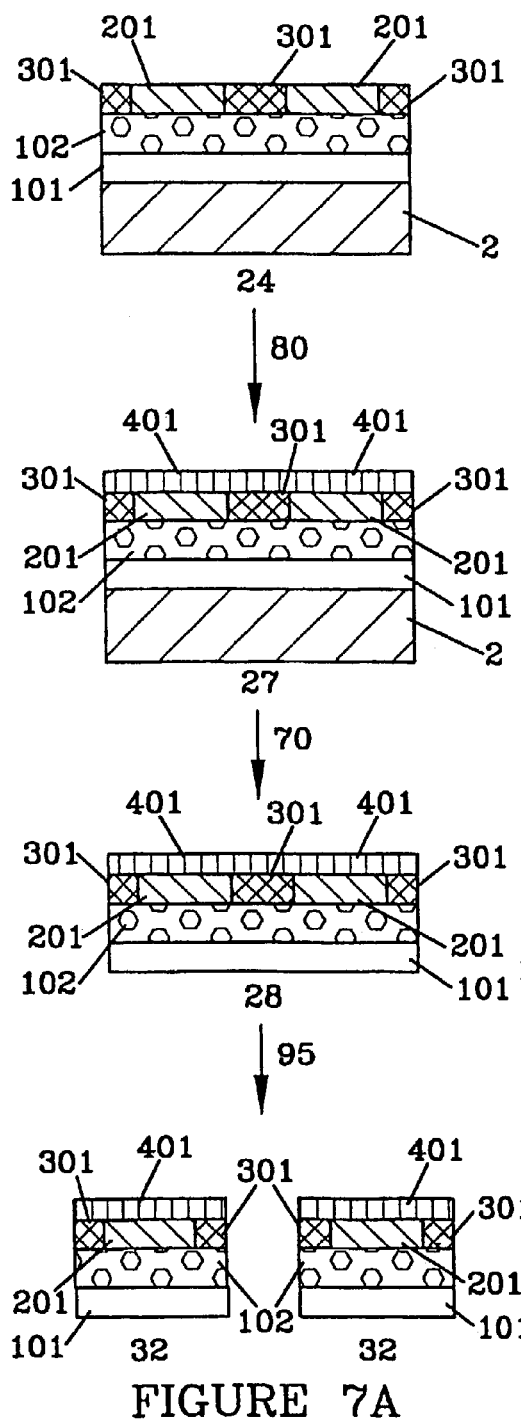
FIGS. 7A and 7B show representative process flow diagrams with cross-sectional views of two other embodiments of the methods of preparing a cathode/separator assembly of this invention, which further comprises, for FIG. 7A, a cathode current collector layer coating step 80 prior to the temporary carrier substrate removing step 70, in comparison to the embodiment illustrated in FIG. 4; and which further comprises, for FIG. 7B, a cathode current collector layer coating step 80 and a slitting step 95 prior to the temporary carrier substrate removing step 70, in comparison to the embodiment illustrated in FIG. 5.
Figure 7B:
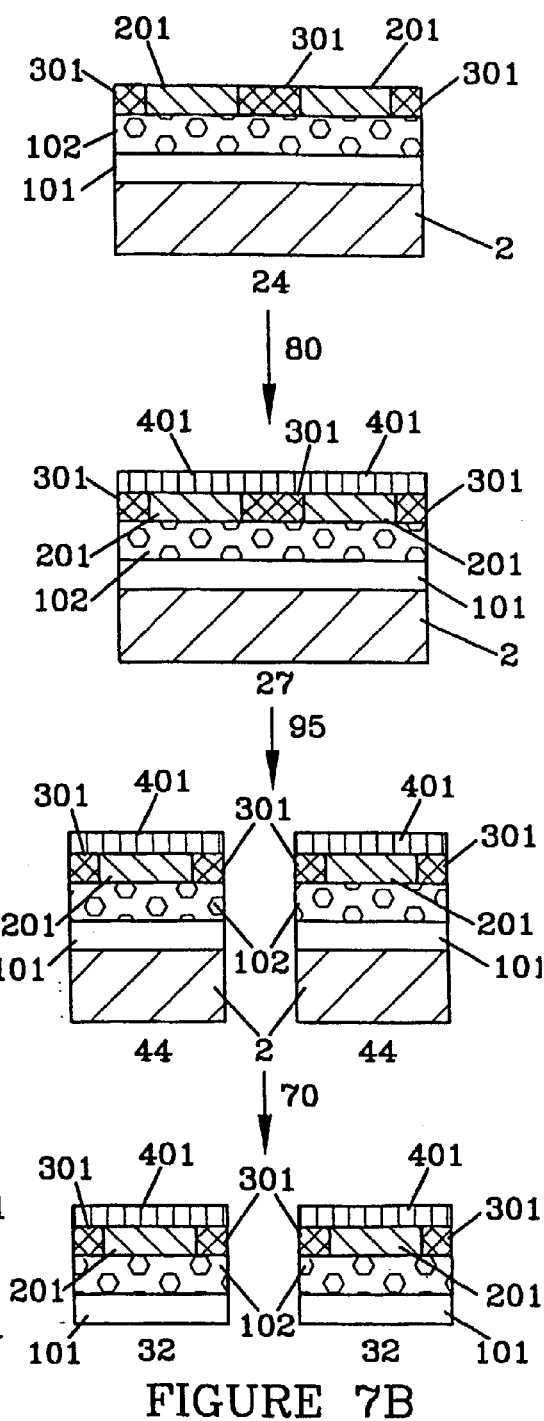

In one embodiment of the methods of preparing a cathode/separator assembly of this invention, the methods further comprise a step of depositing a cathode current collector layer in a desired pattern on the outer surface of the cathode active layer and on the outer surface of the edge insulating layer, for example, as illustrated in FIGS. 7A and 7B. In one embodiment, the step of depositing the cathode current collector layer occurs subsequent to the first protective layer, microporous separator, and cathode active layer coating steps, subsequent to the step of coating the edge insulating layer, and prior to the temporary carrier substrate removing step, for example, as illustrated in FIGS. 7A and 7B. Referring to FIG. 7A (not drawn to scale), in a cathode current collector layer coating step 80, a cathode current collector layer 401 is coated in a desired pattern on the cathode active layer 201 and the edge insulating layer 301 of composite 24, which composite 24 may be formed by the methods illustrated in FIGS. 4 and 5. This step 80 forms composite 27 comprising cathode current collector layer 401, cathode active layer 201, edge insulating layer 301, microporous separator layer 102, first protective coating layer 101, and temporary carrier substrate 2. Next, in a temporary carrier substrate removing step 70, the temporary carrier substrate 2 is removed from the microporous separator layer 102 of composite 27 to form cathode/separator assembly 28 comprising cathode current collector layer 401, cathode active layer 201, edge insulating layer 301, microporous separator layer 102, and first protective coating layer 101. If a smaller dimension is desired for cathode/separator assembly 28, in a slitting step 95, cathode/separator assembly 28 may be cut or slit to form multiples of cathode/separator assembly 32 comprising cathode current collector layer 401, cathode active layer 201, edge insulating layer 301, microporous separator layer 102, and first protective coating layer 101. Referring to FIG. 7B (not drawn to scale), this is similar to FIG. 7A except that the sequence of the slitting step 95 and the temporary carrier substrate removing step 70 are reversed. In both FIG. 7A and FIG. 7B, the final product is cathode/separator assembly 32.

In one embodiment of the methods of preparing a cathode/separator assembly of the present invention, the methods further comprise a step of coating an electrode insulating layer in a desired pattern on the outer surface of the cathode current collector layer and on the surface of the edge insulating layer, for example, as illustrated in FIGS. 8A and 8B. Referring to FIG. 8A (not drawn to scale), in an electrode insulating layer coating step 90, an electrode insulating coating layer 501 is coated in a desired pattern onto the cathode current collector layer 401 and the edge insulating layer 301 of composite 23. This step 90 forms composite 29 comprising electrode insulating layer 501, cathode current collector layer 401, cathode active layer 201, edge insulating layer 301, microporous separator layer 102, first protective coating layer 101, and temporary carrier substrate 2. Next, in a temporary carrier substrate removing step 70, the temporary carrier substrate 2 is removed from the first protective coating layer 101 of composite 29 to form cathode/separator assembly 30 comprising electrode insulating layer 501, cathode current collector layer 401, cathode active layer 201, edge insulating layer 301, microporous separator layer 102, and first protective coating layer 101. If a smaller dimension is desired for cathode/separator assembly 30, in a slitting step 95, cathode/separator assembly 30 may be slit or cut to form multiples of cathode/separator assembly 47 comprising electrode insulating layer 501, cathode current collector layer 401, cathode active layer 201, edge insulating layer 301, microporous separator layer 102, and first protective coating layer 101. FIG. 8B (not drawn to scale) is similar to FIG. 8A except that the sequence of the slitting step 95 and the temporary carrier substrate removing step 70 are reversed. In both FIG. 8A and FIG. 8B, the final product is cathode/separator assembly 47.

The terms "coating" and "depositing," as used herein, are synonymous and pertain to the application of a layer of a material to another layer of a material, such as to a substrate or to a coating layer on a substrate.

The various coating layers in the methods of preparing a cathode/separator assembly of the present invention may be coated from a liquid mixture comprising a liquid carrier medium and the solid materials of the layer which are dissolved or dispersed in the liquid carrier medium. The choice of the liquid carrier medium may vary widely and includes water, organic solvents, and blends of water and organic solvents. Exemplary organic solvents include, but are not limited to, alcohols, ketones, esters, and hydrocarbons. The choice of the liquid carrier medium depends mainly on the compatibility with the particular solid materials utilized in the specific coating layer, on the type or method of coating application to the receiving surface, and on the requirements for wettability and other coating application properties of the particular receiving surface for the coating. For example, for coating a microporous xerogel layer, the liquid carrier medium is typically water or a blend of water with an alcohol solvent, such as isopropyl alcohol or ethyl alcohol, since the sol-gel materials that dry and condense to form the xerogel layer typically are most compatible with a water-based, highly polar liquid carrier medium.

The application of the liquid coating mixture to the temporary carrier substrate or other layer may be done by any suitable process, such as coating methods known in the art of coating liquid mixtures, for example, wire-wound rod coating, spray coating, spin coating, reverse roll coating, gravure coating, slot extrusion coating, gap blade coating, and dip coating. The liquid coating mixture may have any desired solids content that is consistent with the viscosity and rheology that is acceptable in the coating application method. After the liquid coating mixture is applied on the temporary carrier substrate or other layer, the liquid carrier medium is typically removed to provide a dried, solid coating layer. This removal of the liquid carrier medium may be accomplished by any suitable process, such as methods of drying coatings known in the art, for example, hot air at a high velocity or exposure to ambient air conditions.

In an alternative approach, the coating layers of the present invention may be coated or deposited by vacuum deposition, sputtering, laser ablation, or other non-liquid coating processes known in the art for applying thin layers of metals, of inorganic materials, or of organic materials, and combinations thereof, to a substrate or to another coating layer.

Cathode/Separator Assemblies

Another aspect of the present invention pertains to cathode/separator assemblies prepared according to the methods of the present invention, as described herein. Thus, the cathode/separator assemblies of the present invention comprise a cathode active layer, a microporous separator layer, and one or more protective coating layers, which cathode/separator assemblies are prepared according to the methods of this invention.

Methods of Preparing Electrochemical Cells

Another aspect of the present invention pertains to methods of preparing an electrochemical cell, which methods comprise the steps of: (a) providing a cathode/separator assembly prepared by a method comprising the steps of (i) coating a first protective coating layer, as described herein, on a temporary carrier substrate, wherein the first protective coating layer has a first surface in contact with the temporary carrier substrate and has a second surface on the side opposite from the temporary carrier substrate; (ii) coating a microporous separator layer on the second surface of the first protective coating layer, wherein the separator layer has a first surface in contact with the first protective coating layer and has a second surface on the side opposite from the first protective coating layer; (iii) coating a cathode active layer in a desired pattern on the second surface of the separator layer, wherein the cathode active layer has a first surface in contact with the second surface of the separator layer and has a second surface on the side opposite from the separator layer; and (iv) removing the temporary carrier substrate from the first surface of the first protective coating layer to form the cathode/separator assembly; (b) providing an anode; (c) providing a cathode current collector layer; (d) providing an electrode insulating layer interposed between the anode and the cathode current collector layer; and (e) providing an electrolyte, wherein the electrolyte is contained in the pores of the separator layer; and wherein the first surface of the first protective coating layer of the cathode/separator assembly and the anode are positioned in a face-to-face relationship and the second surface of the cathode active layer and the cathode current collector layer are positioned in a face-to-face relationship.

In one embodiment of the methods of preparing an electrochemical cell of this invention, the first protective coating layer is a single ion conducting layer, as described herein. Suitable single ion conducting layers include, but are not limited to, glassy layers comprising a glassy material selected from the group consisting of lithium silicates, lithium borates, lithium aluminates, lithium phosphates, lithium phosphorus oxynitrides, lithium silicosulfides, lithium germanosulfides, lithium lanthanum oxides, lithium titanium oxides, lithium borosulfides, lithium aluminosulfides, and lithium phosphosulfides. In a preferred embodiment, the single ion conducting layer comprises a lithium phosphorus oxynitride. In one embodiment, the first protective coating layer is an ionically conductive layer which is impervious to dimethoxyethane and 1,3-dioxolane and combinations thereof. In one embodiment, the first protective coating layer comprises a polymer selected from the group consisting of electrically conductive polymers, ionically conductive polymers, sulfonated polymers, and hydrocarbon polymers. In one embodiment, the first protective coating layer comprises an electrically conductive pigment. In one embodiment, the first protective coating layer comprises an aromatic hydrocarbon.

In one embodiment, the first protective coating layer comprises an ionically conductive polymer. In a preferred embodiment, the ionically conductive polymer is a polydivinyl-poly(ethylene glycol). In one embodiment, the first protective coating layer comprises a sulfonated polymer. In one embodiment, the sulfonated polymer is a sulfonated polystyrene.

In one embodiment, the first protective coating layer comprises a microporous xerogel layer. Suitable materials for the microporous xerogel layer of the first protective coating layer include, but are not limited to, oxides selected from the group consisting of pseudo-boehmite, zirconium oxide, titanium oxide, aluminum oxide, silicon oxide, and tin oxide. In a preferred embodiment, the material of the xerogel layer comprises pseudo-boehmite or zirconium oxide, or combinations thereof. In one embodiment, the microporous xerogel layer comprises an organic polymer. In one embodiment, the microporous xerogel layer of the first protective coating layer comprises an ionically conductive polymer in the pores of the microporous xerogel layer. In one embodiment, the ionically conductive polymer in the pores of the xerogel layer is a polydivinyl-poly(ethylene glycol). In one embodiment, the ionically conductive polymer in the pores of the xerogel layer is a sulfonated polymer.

In one embodiment, the first protective coating layer comprises a release agent. In one embodiment, the release agent of the xerogel layer comprises a perfluorinated moiety.

In one embodiment, the microporous separator layer comprises one or more microporous xerogel layers. In one embodiment, the cathode/separator assembly further comprises a second protective coating layer, wherein the second protective coating layer is in contact with at least one of the one or more microporous layers of the separator layer.

In one embodiment of the methods of preparing an electrochemical cell of this invention, the cell is a secondary cell. In one embodiment of the methods of preparing an electrochemical cell of this invention, the cell is a primary cell. The methods of preparing an electrochemical cell of the present invention further are useful for preparing fuel cells, sensors, supercapacitors, electrochromic devices, and the like, in which microporous separators or thin protective coatings are also part of the overall product designs.

In a preferred embodiment of the methods of preparing an electrochemical cell of this invention, the microporous separator layer comprises one or more microporous pseudo-boehmite xerogel layers. In a more preferred embodiment, the cathode/separator assembly further comprises a second protective coating layer, wherein the second protective coating layer is in contact with at least one of the one or more microporous pseudo-boehmite layers.

Suitable electroactive materials in the cathode active layer for the methods of preparing an electric current producing cell of the present invention include, but are not limited to, electroactive transition metal chalcogenides, electroactive conductive polymers, and electroactive sulfur-containing materials, as described herein.

A wide variety of anode active materials may be utilized in the anodes for the methods of preparing an electrochemical cell of the present invention. Suitable anode active materials for the anodes include, but are not limited to, hydrogen-storing alloys for use with nickel-containing cathodes, and one or more metals or metal alloys or a mixture of one or more metals and one or more alloys, wherein the metals are selected from the Group IA and IIA metals in the Periodic Table. Examples of suitable anode active materials include, but are not limited to, alkali-metal intercalated conductive polymers, such as lithium doped polyacetylenes, polyphenylenes, polypyrroles, and the like, and alkali-metal intercalated graphites and carbons. Anode active materials comprising lithium are especially useful. Preferred anode active materials in the methods of preparing an electrochemical cell of this invention are lithium metal, lithium-aluminum alloys, lithium-tin alloys, lithium-intercalated carbons, and lithium-intercalated graphites.

The electrolyte used in the present invention functions as a medium for storage and transport of ions, and may be any of the types of electrolytes known in the art of electrochemical cells. Any liquid, solid, or solid-like material capable of storing and transporting ions may be used, so long as the material is sufficiently chemically and electrochemically stable with respect to the anode and the cathode and the material facilitates the transportation of ions between the anode and the cathode without providing electrical conductivity that might cause a short circuit between the anode and the cathode. Electrolytes may be aqueous, non-aqueous, organic, or inorganic.

Examples of suitable electrolytes for use in the methods of preparing an electrochemical cell of the present invention include, but are not limited to, electrolytes comprising one or more electrolytes selected from the group consisting of liquid electrolytes, gel polymer electrolytes, solid polymer electrolytes, and single ion conducting electrolytes. In a preferred embodiment, the electrolyte comprises a liquid electrolyte.

Examples of suitable liquid electrolytes include, but are not limited to, those comprising one or more electrolyte solvents selected from the group consisting of water, N-methyl acetamide, acetonitrile, carbonates, sulfones, sulfolanes, aliphatic ethers, cyclic ethers, glymes, siloxanes, dioxolanes, N-alkyl pyrrolidones, substituted forms of the foregoing, and blends thereof; to which is added an appropriate ionic electrolyte salt.

The electrolyte solvents of these liquid electrolytes are themselves useful as plasticizers in semi-solid or gel polymer electrolytes. Suitable gel polymer electrolytes include, but are not limited to, those comprising, in addition to one or more electrolyte solvents sufficient to provide the desired semi-solid or gel state, one or more polymers. Examples of suitable polymers include, but are not limited to, those selected from the group consisting of polyethylene oxides (PEO), polypropylene oxides, polyacrylonitriles, polysiloxanes, polyphosphazenes, polyimides, polyethers, sulfonated polyimides, polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing; to which is added an appropriate ionic electrolyte salt.

Solid polymer electrolytes useful in the present invention include, but are not limited to, those comprising one or more polymers selected from the group consisting of polyethers, polyethylene oxides (PEO), polypropylene oxides, polyimides, polyphosphazenes, polyacrylonitriles, polysiloxanes, polyether grafted polysiloxanes, derivatives of the foregoing, copolymers of the foregoing, crosslinked and network structures of the foregoing, and blends of the foregoing; to which is added an appropriate ionic electrolyte salt. The solid polymer electrolytes of this invention may optionally further comprise one or more electrolyte solvents, typically at a level of less than 20 per cent by weight of the solid polymer electrolyte.

To improve the ionic conductivity and other electrochemical properties, the electrolyte typically comprises one or more ionic electrolyte salts. As used herein, liquid electrolytes, gel polymer electrolytes, and solid polymer electrolytes comprise an ionic electrolyte salt.

Examples of ionic electrolyte salts suitable for use in the present invention include, but are not limited to, MBr, MI, $MClO_4$, $MAsF_6$, MSCN, $MSO_3CF_3$, $MSO_3CH_3$, $MBF_4$, $MB(Ph)_4$, $MPF_6$, $MC(SO_2CF_3)_3$, $MN(SO_2CF_3)_2$,

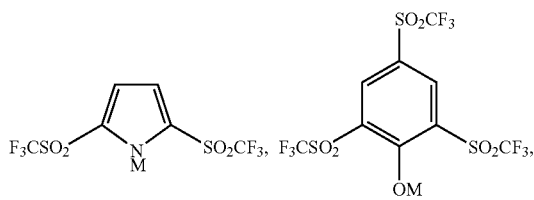

and the like, where M is Li or Na. Other electrolyte salts useful in the practice of this invention are alkali metal hydroxides, lithium polysulfides, lithium salts of organic ionic polysulfides, and those disclosed in U.S. Pat. No. 5,538,812 to Lee et al. Preferred ionic electrolyte salts are LiI, LiSCN, $LiSO_3CF_3$ (lithium triflate), and $LiN(SO_2CF_3)_2$ (lithium imide).

In one embodiment of the methods of preparing an electrochemical cell of the present invention, the electrode insulating layer comprises a polymeric plastic film, such as, for example, a polyethylene terephthalate film, a polyethylene naphthalate film, and a polyimide film. In one embodiment, the electrode insulating layer comprises a polymeric coating, such as, for example, an ethylene-propylene polymer coating.

Since the one or more microporous xerogel layers of the separator layer of the methods of this invention are usually impermeable to high molecular weight materials such as the polymers typically used in gel polymer electrolytes and solid polymer electrolytes, it is preferable to introduce the polymer component of the electrolyte in a low molecular weight monomer or macromonomer form into the pores of the xerogel layer, such as in a coating step prior to the cathode active layer coating step or in a coating step after the step of removing the temporary carrier substrate from the separator layer. Subsequently, the low molecular weight monomer or macromonomer may be cured into a polymer to provide the desired type of solid polymer or gel polymer electrolyte. Suitable monomers or macromonomers include, but are not limited to, heat- or radiation-curable monomers or macromonomers. Examples include, but are not limited to, divinyl ethers such as tetraethylene glycol divinyl ether and urethane acrylate macromonomers. To provide sensitivity to ultraviolet (UV) or visible radiation when the monomers or macromonomers do not absorb significantly, a photosensitizer, as known in the art of sensitization of photocurable coatings, may be added to accelerate curing of the monomers or macromonomers into a polymeric material. For example, a small amount of a UV sensitizer, such as 0.2% by weight of the monomers or macromonomers, may be added. The typically transparent or nearly transparent nature of the microporous layers of the separator layer of the methods of this invention is beneficial in allowing the sensitizing ultraviolet or visible radiation to efficiently penetrate throughout the separator layer. Also, the positioning of the separator layer may be on the outside of the cell stack when the electrolyte is present in pores of the separator, for example, as illustrated for cell stack 38 in FIG. 9 and for cell stack 54 in FIG. 10. This is particularly convenient for carrying out radiation curing of the electrolyte with ultraviolet or visible radiation.

Another aspect of the present invention pertains to methods of preparing an electrochemical cell, which methods comprise the steps of (a) providing a cathode/separator assembly prepared by a method comprising the steps of (i) coating a first protective coating layer on a temporary carrier substrate, wherein the first protective coating layer has a first surface in contact with the temporary carrier substrate and has a second surface on the side opposite from the temporary carrier substrate; (ii) coating a microporous separator layer on the second surface of the first protective coating layer, wherein the separator layer has a first surface in contact with the first protective coating layer and has a second surface on the side opposite from the first protective coating layer; (iii) coating a cathode active layer in a desired pattern on the second surface of the separator layer, wherein the cathode active layer has a first surface in contact with the second surface of the separator layer and has a second surface on the side opposite from the separator layer; (iv) coating an edge insulating layer in a desired pattern on the second surface of the separator layer, wherein the edge insulating layer has a first surface in contact with the second surface of the separator layer and has a second surface on the side opposite from the separator layer; and (v) removing the temporary carrier substrate from the first surface of the first protective coating layer to form the cathode/separator assembly; (b) providing an anode; (c) providing a cathode current collector layer; (d) providing an electrode insulating layer interposed between the anode and the cathode current collector layer; and (e) providing an electrolyte, wherein the electrolyte is contained in the pores of the separator layer; wherein the first surface of the first protective coating layer of the cathode/separator assembly and the anode are positioned in a face-to-face relationship and the second surface of the cathode active layer and the cathode current collector layer are positioned in a face-to-face relationship.

Another aspect of the present invention pertains to methods of preparing an electrochemical cell, which methods comprise the steps of (a) coating a first protective coating layer on a temporary carrier substrate, as described herein; (b) coating a microporous separator layer, as described herein, on the first protective coating layer, (c) coating a cathode active layer, as described herein, in a desired pattern on a surface of the separator layer, which surface is on the side of the separator layer opposite from the first protective coating layer; (d) depositing a cathode current collector layer in a desired pattern on a surface of the cathode active layer, which surface is on the side of the cathode active layer opposite from the separator layer; (e) depositing an electrode insulating layer in a desired pattern on a surface of the cathode current collector layer, which surface is on the side of the cathode current collector layer opposite from the cathode active layer; (f) depositing an anode current collector layer in a desired pattern on a surface of the electrode insulating layer, which surface is on the side of the electrode insulating layer opposite from the cathode current collector layer; (g) depositing an anode active material layer in a desired pattern on a surface of the anode current collector layer, which surface is on the side of the anode current collector layer opposite from the electrode insulating layer; (h) removing the temporary carrier substrate from the first protective coating layer; and (i) providing an electrolyte, wherein the electrolyte is contained in the pores of the separator layer. In one embodiment, step (g) of the methods further comprises depositing an anode protective coating layer on the anode active material. In one embodiment, the anode protective coating layer is a single ion conducting layer, as described herein for the protective coating layers in contact to the separator layer. Suitable single ion conducting layers for the anode protective coating layer include, but are not limited to, glassy layers comprising a glassy material selected from the group consisting of lithium silicates, lithium borates, lithium aluminates, lithium phosphates, lithium phosphorus oxynitrides, lithium silicosulfides, lithium germanosulfides, lithium lanthanum oxides, lithium titanium oxides, lithium borosulfides, lithium aluminosulfides, and lithium phosphosulfides. In a preferred embodiment, the single ion conducting layer comprises a lithium phosphorus oxynitride. In one embodiment, the anode protective coating layer is an ionically conductive layer, as described herein, which is impervious to dimethoxyethane and 1,3-dioxolane and combinations thereof. In one embodiment, the anode protective coating layer comprises a polymer, as described herein for the protective coating layers in contact with the separator layer, which polymer is selected from the group consisting of electrically conductive polymers, ionically conductive polymers, sulfonated polymers, and hydrocarbon polymers. In one embodiment, the anode protective coating layer comprises an electrically conductive pigment, as described herein for the protective coating layers in contact with the separator layer. In one embodiment, the anode protective coating layer comprises an aromatic hydrocarbon, as described herein for the protective coating layers in contact with the separator layer. In one embodiment, the anode protective coating layer comprises a metal, such as copper, that blends with, diffuses into, or forms an alloy with lithium.

Figure 9:
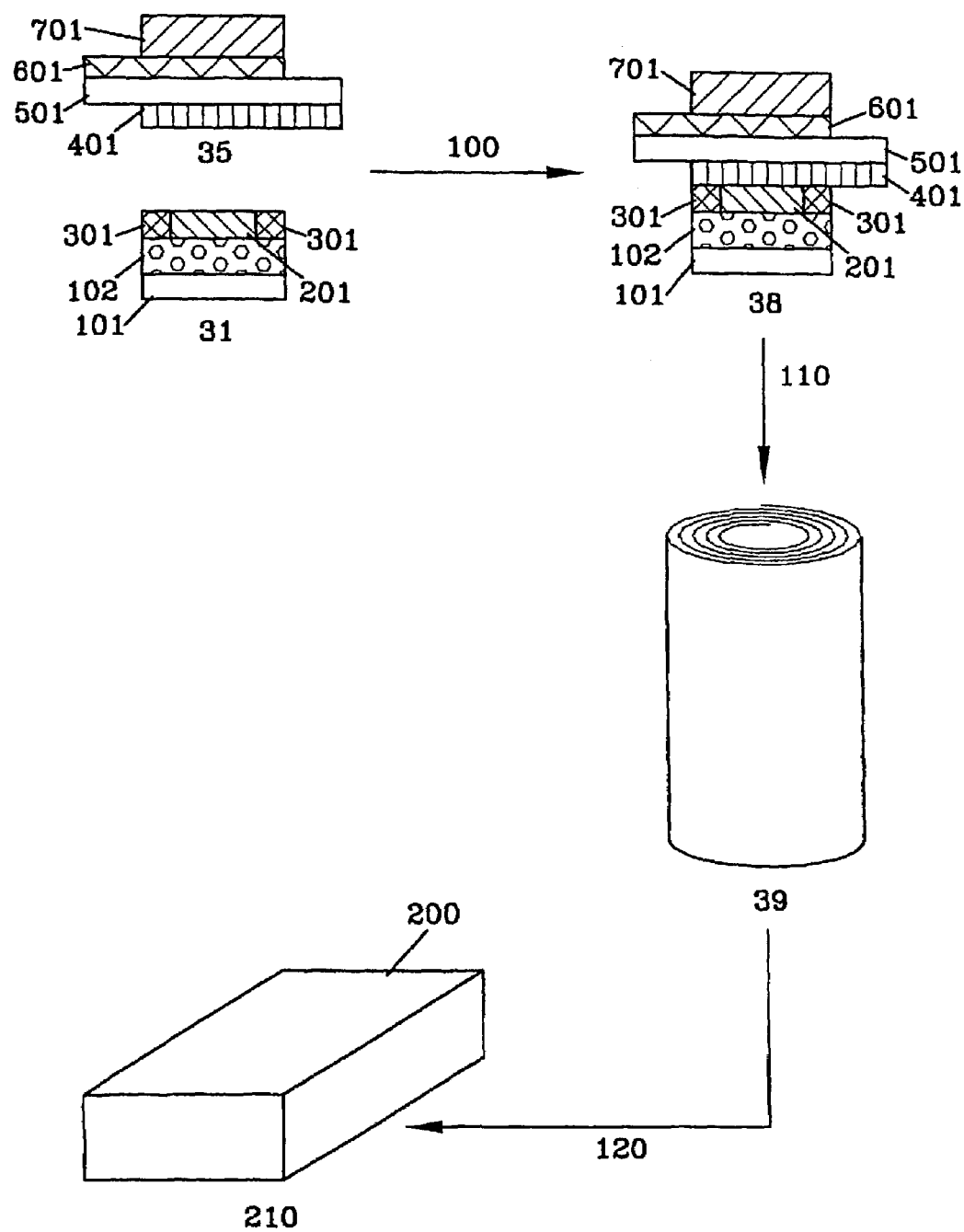
FIG. 9 shows a representative process flow diagram with cross-sectional views of one embodiment of the methods of preparing an electrochemical cell of this invention, which comprises a combining step 100 utilizing a cathode/separator assembly 31 as one element, a winding step 110, and an electrolyte filling and sealing step 120.

Another aspect of this invention pertains to methods of preparing an electrochemical cell comprising a casing and a multilayer cell stack, which methods comprise the steps of (a) providing a laminar combination of: (i) an anode assembly comprising an anode comprising an anode active layer; wherein the anode active layer comprises an anode active material comprising lithium, a first cathode current collector layer, and an electrode insulating layer interposed between the anode and the first cathode current collector layer, and (ii) a cathode/separator assembly comprising a first protective coating layer having a first surface and a second surface on the side opposite to the first surface, a microporous separator layer having a first surface in contact with the second surface of the first protective coating layer and having a second surface on the side opposite to the first protective coating layer, a cathode active layer in a first desired coating pattern on the second surface of the microporous separator layer, and an edge insulating layer in a second desired coating pattern on the second surface of the separator layer, wherein the cathode active layer has a first surface in contact in the first desired coating pattern with the second surface of the separator layer and has a second surface on the side opposite from the separator layer, and the edge insulating layer has a first surface in contact in the second desired coating pattern with the second surface of the separator layer and has a second surface on the side opposite to the separator layer; wherein the first cathode current collector layer and the second surface of the cathode active layer are positioned in a face-to-face relationship; (b) winding the laminar combination to form an anode-electrode insulating layer-first cathode current collector layer-cathode/separator assembly multilayer cell stack, wherein the first cathode current collector layer is in contact with the second surface of the cathode active layer; (c) providing an electrolyte, wherein the electrolyte is contained in the pores of the separator layer of the multilayer cell stack; (d) providing a casing to enclose the multilayer cell stack; and (e) sealing the casing. FIG. 9 illustrates one embodiment of this aspect of the methods of the present invention.

The term "multilayer cell stack," as used herein, pertains to a cell stack, which cell stack within an electrochemical cell, when viewed in a cross-section of at least one profile plane, has more than one electrochemical layer, i.e., more than one combined anode-electrolyte element-cathode construction. A single layer cell stack has only one anode-electrolyte element-cathode construction when viewed in a cross-section of at least one profile plane. The term "casing," as used herein, pertains to the outermost surface of an electrochemical cell, where the outermost surface is adjacent to the multiple electrochemical anode-electrolyte element-cathode layers or multilayer cell stack and acts as a seal or barrier against the transport of liquids or volatile materials into or out of the cell stack.

A wide variety of barrier materials may be utilized for the casing in the methods of preparing multilayer electrochemical cells of this invention. Suitable barrier materials include, but are not limited to, metal films, plastic-metal composite films, plastic films, and rigid metal sheeting and cans. The basic requirement of the barrier materials is that they can be sealed by a suitable process, such as heating, ultrasonic welding, or laser welding, to form a sealed casing for the electrochemical cell, in which the barrier material in the sealed casing provides a barrier against the leakage of fluids through the casing. For example, the barrier material may be provided as two sheets of matched size which are positioned on either side of the cell stack and subsequently sealed on all four edges to form the casing of a prismatic cell.

Referring to FIG. 9 (not drawn to scale), in a combining step 100, a cathode/separator assembly 31 comprising cathode active layer 201, edge insulating layer 301, microporous separator layer 102, and first protective coating layer 101, which cathode/separator assembly 31 may be formed by the method illustrated in FIG. 4, is combined with an anode assembly 35 comprising an anode active layer 701, anode current collector layer 601, electrode insulating layer 501, and cathode current collector layer 401 to form an anode-electrode insulating layer-cathode/separator assembly combination 38. Next, in a winding step 110, combination 38 is wound, stacked, or otherwise combined to form an anode-electrode insulating layer-cathode/separator assembly multilayer cell stack 39. Following this step 110, in an electrolyte filling and sealing step 120, multilayer cell stack 39 is provided with electrolyte in the pores of the separator and is further provided with a casing 200 which is sealed around the cell stack to form electrochemical cell 210. The cell stack and the casing may be of a variety of shapes and sizes including, but not limited to, cylindrical and prismatic.

The term "prismatic," as used herein, pertains to a solid shape where at least two surfaces are substantially flat and parallel to each other. The dimensions of the cell stacks produced in the methods of the present invention depend on the widths and lengths of the anode and cathode/separator assemblies as wound, stacked, or otherwise combined into a multilayer cell stack and, optionally, on any slitting or cutting of these assemblies that occurs after the winding step. Typically, the anode assembly and the cathode/separator assembly are of similar, but distinct, widths and lengths and may be slightly offset from each other on the edges to allow for more efficient electrical connections by tabs and other electrical contacts and for more effective insulation against internal short circuits, as known in the art of battery fabrication as, for example, described in U.S. Pat. No. 5,439,760 to Howard et al. and U.S. Pat. No. 5,549,717 to Takeuchi et al. Also, the anode assembly and the cathode/separator assembly may be of identical widths or, alternatively, may be wound, stacked, or otherwise combined in dimensions greater than the desired dimensions in the cell stack and subsequently may be cut down to the desired dimensions.

Tabs are well known in the art of fabricating electrochemical cells, including cylindrical and prismatic cells, for providing the connections between the anode and the cathode to the external circuit for the cell. For example, in the methods of preparing electrochemical cells of the present invention, one or more tabs may be connected to the anode and then attached or fed through the casing of the cell for connection to the external circuit. For anodes comprising lithium metal, for example lithium foil, the connection of the tab to the anode may be directly to the lithium metal or, alternatively, may be to an anode current collector layer, if one is present in the anode. Suitable materials for use in the anode tabs include, but are not limited to, nickel and copper, such as, for example, 0.125 inch thick nickel tabs. These metal tabs to the anode may be attached to the lithium metal of the anode or to the anode current collector layer, if one is present, by a variety of conventional methods, such as, for example, by applying pressure or by ultrasonic welding.

For the cathodes of the methods of preparing electrochemical cells of the present invention, the connection of one or more tabs is typically made to the cathode current collector layer. Suitable materials for use in the cathode tabs include, but are not limited to, aluminum, nickel, silver, tin, and stainless steel. These metal tabs to the cathode may be attached to the cathode current collector layer by a variety of methods known in the art, such as, for example, by applying pressure or by ultrasonic welding.

The insertion and attachment of the tabs to the anode and to the cathode may occur at various steps in the methods of preparing electrochemical cells of the present invention as long as it occurs before the completion of the filling step with the electrolyte. For example, the tabbing steps on the anode and the cathode may be done prior to the winding step; or may be done subsequent to the winding step, but before the filling and sealing step.

The leads of the tabs protrude from the cell stack and, particularly in the case of prismatic cells, may extend from the casing after sealing so that the leads may be connected to the external circuit. These leads may be part of the original tabs that were attached to the electrodes or may be conductive extensions that have been attached or added to the original tabs. To prevent any short circuits between the anode and the cathode, the one or more anode tabs and the one or more cathode tabs are maintained in an electrically insulated relationship to each other.

As the layers in a multilayer cell stack of an electrochemical cell become thinner and the total surface areas of the anode and cathode become larger, it becomes progressively more difficult to achieve efficient collection of the current from the cell using a single tab, or a small number of tabs, from the anode and from the cathode to the external circuit. Also, current collection through only a few tabs or a single tab to a lithium metal foil anode in a large surface area cell, such as, for example, 1000 $cm^2$ of lithium metal foil anode in a prismatic cell with external dimensions of 34 mm wide, 70 mm long, and 7 mm thick, may have a shortened cycle life due to severing or loss of lithium metal at the tab connections. This would prevent current collection from any portion of the cell no longer connected electrically to the severed tab connection. Accordingly, it is advantageous to do a continuous edge contacting of the edges of the anode and the cathode in addition to at least one tab to the anode and to the cathode to collect the current from the continuous edge contacting for connection to the external circuit.

When the anode of the methods of preparing electrochemical cells of the present invention is lithium metal which also acts as the anode current collector layer, the edge of the lithium metal anode may be placed in electrical contact by a variety of methods including, but not limited to, ultrasonic welding and metal spraying. In one embodiment, the edge of the lithium metal anode extends beyond the corresponding edges of the cathode active layer, the microporous separator layer, and the first protective coating layer, and substantially all of the lithium metal extensions are placed in electrical contact by ultrasonic welding.

When the anode of the methods of preparing electrochemical cells of this invention comprises an anode active layer comprising lithium and an anode current collector layer, as described herein, the edge of the conductive layer of the anode current collector layer may be placed in electrical contact by a variety of methods including, but not limited to, metal spraying. In one embodiment, the edge of the anode current collector layer provides a plurality of anode contact edges for the multilayer cell stack; and a metallic layer is deposited in electrical contact with the anode current collector layers at substantially all of the anode contact edges. Suitable metals for the metallic layer include, but are not limited to, copper and nickel. Preferably, the metallic layer is deposited by metal spraying. In one embodiment, the conductive material of the anode current collector layer comprises copper, and the electrode insulating layer of the cell is selected from the group consisting of polymeric plastic films and polymeric coatings.

When the cathode of the methods of preparing electrochemical cells of the present invention comprises a cathode current collector layer, as described herein, the edge of the cathode current collector layer may be placed in electrical contact by a variety of methods including, but not limited to, ultrasonic welding and metal spraying. In one embodiment, the edge of the cathode current collector layer provides a plurality of cathode contact edges for the multilayer cell stack; and a metallic layer is deposited in electrical contact with the cathode current collector layers at substantially all of the cathode contact edges; and, preferably, the edge of the cathode current collector layer extends beyond the corresponding edges of the cathode active layer, the microporous separator layer, the first protective coating layer, and the anode. Suitable metals for the metallic layer include, but are not limited to, aluminum, nickel, silver, tin, and stainless steel. Preferably, the metallic layer is deposited by metal spraying.

The electrolyte may be introduced into the cathode/separator assembly in part or completely at various steps in the methods of preparing an electrochemical cell of this invention. Typically, the electrolyte is introduced into the cathode/separator assembly after the casing is formed around the cathode/separator/anode assembly through an opening in the casing. This filling step is followed by the complete sealing of the casing by closing the fill opening. Alternatively, the electrolyte may be introduced before the casing is formed around the cathode/separator/anode assembly, as, for example, described in U.S. patent application Ser. No. 09/215,029 titled "Methods for Preparing Prismatic Cells," filed Dec. 17, 1998, to Thibault et al. of the common assignee, the disclosure of which is fully incorporated herein by reference. Also, part or all of the electrolyte may be impregnated into the pores of the cathode/separator assembly 31 before the winding step 110, as, for example, described in U.S. patent application Ser. No. 08/995,089 to Carlson et al. of the common assignee.

Figure 10:
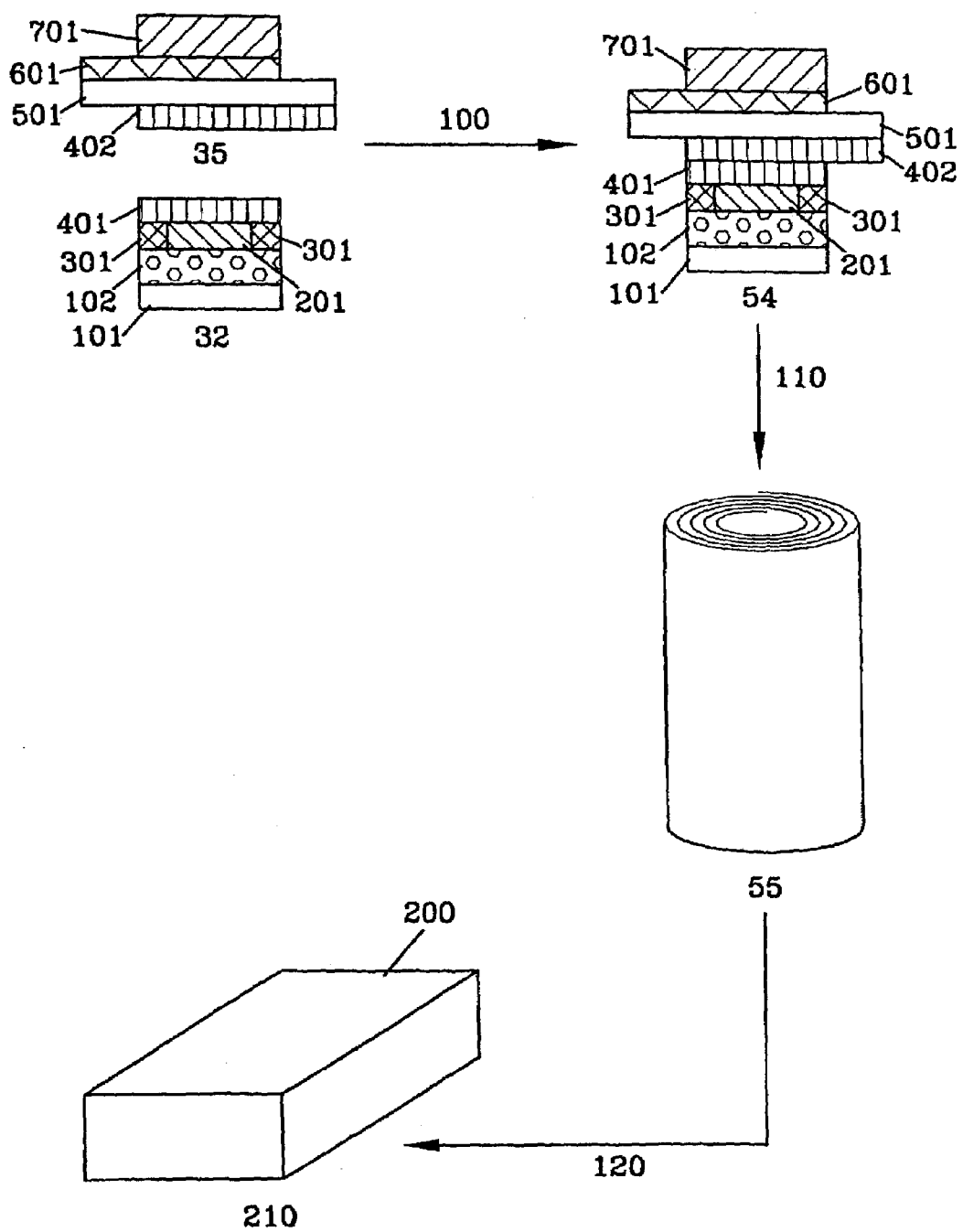
FIG. 10 shows a representative process flow diagram with cross-sectional views of one embodiment of the methods of preparing an electrochemical cell of this invention, which comprises a combining step 100 utilizing a cathode/separator assembly 32 as one element, a winding step 110, and an electrolyte filling and sealing step 120.

In one embodiment of the methods of preparing an electrochemical cell of the present invention, a second cathode current collector layer is deposited in a third desired pattern on the second surface of the cathode active layer and on the second surface of the edge insulating layer, for example, as illustrated in FIG. 10. Referring to FIG. 10 (not drawn to scale), in a combining step 100, a cathode/separator assembly 32 comprising second cathode current collector layer 401, cathode active layer 201, edge insulating layer 301, microporous separator layer 102, and first protective coating layer 101, which cathode/separator assembly 32 may be formed by the methods illustrated in FIGS. 7A and 7B, is combined with an anode assembly 35 comprising anode active layer 701, anode current collector layer 601, electrode insulating layer 501, and first cathode current collector layer 402 to form an anode-electrode insulating layer-cathode/separator assembly combination 54. Next, in a winding step 110, combination 54 is wound, stacked, or otherwise combined to form an anode-electrode insulating layer-cathode/separator assembly multilayer cell stack 55.

Following this step 110, in an electrolyte filling and sealing step 120, multilayer cell stack 55 is provided with electrolyte in the pores of the separator and is further provided with a casing 200 which is sealed around the cell stack to form electrochemical cell 210. The wide variety of sizes and shapes possible for the cell stack and the casing and the variety of options for introducing the electrolyte at different steps in the process are as described hereinabove for the embodiment illustrated in FIG. 9. In one embodiment, as illustrated, for example, in FIG. 10, the anode further comprises an anode current collector layer interposed between the anode active layer and the electrode insulating layer.

In one embodiment of the methods of preparing an electrochemical cell of this invention, the cathode/separator assembly of step (a) further comprises a temporary carrier substrate on the first surface of the protective coating layer, and the methods further comprise a step of removing the temporary carrier substrate from the first surface of the first protective coating layer prior to completion of step (b). In one embodiment, a second cathode current collector layer in a third desired coating pattern is deposited on the second surface of the cathode active layer and on the second surface of the edge insulating layer.

In one embodiment of the methods of preparing an electrochemical cell of the present invention, the anode of the anode assembly and the first surface of the protective coating layer of the cathode/separator assembly are positioned in a face-to-face relationship in step (a), and a first cathode current collector layer-electrode insulating layer-anode-cathode/separator assembly multilayer cell stack is formed in step (b), wherein the anode is in contact with the first surface of the protective coating layer. In one embodiment, a second cathode current collector layer is deposited in a third desired coating pattern on the second surface of the cathode active layer and on the second surface of the edge insulating layer.

Figure 11:
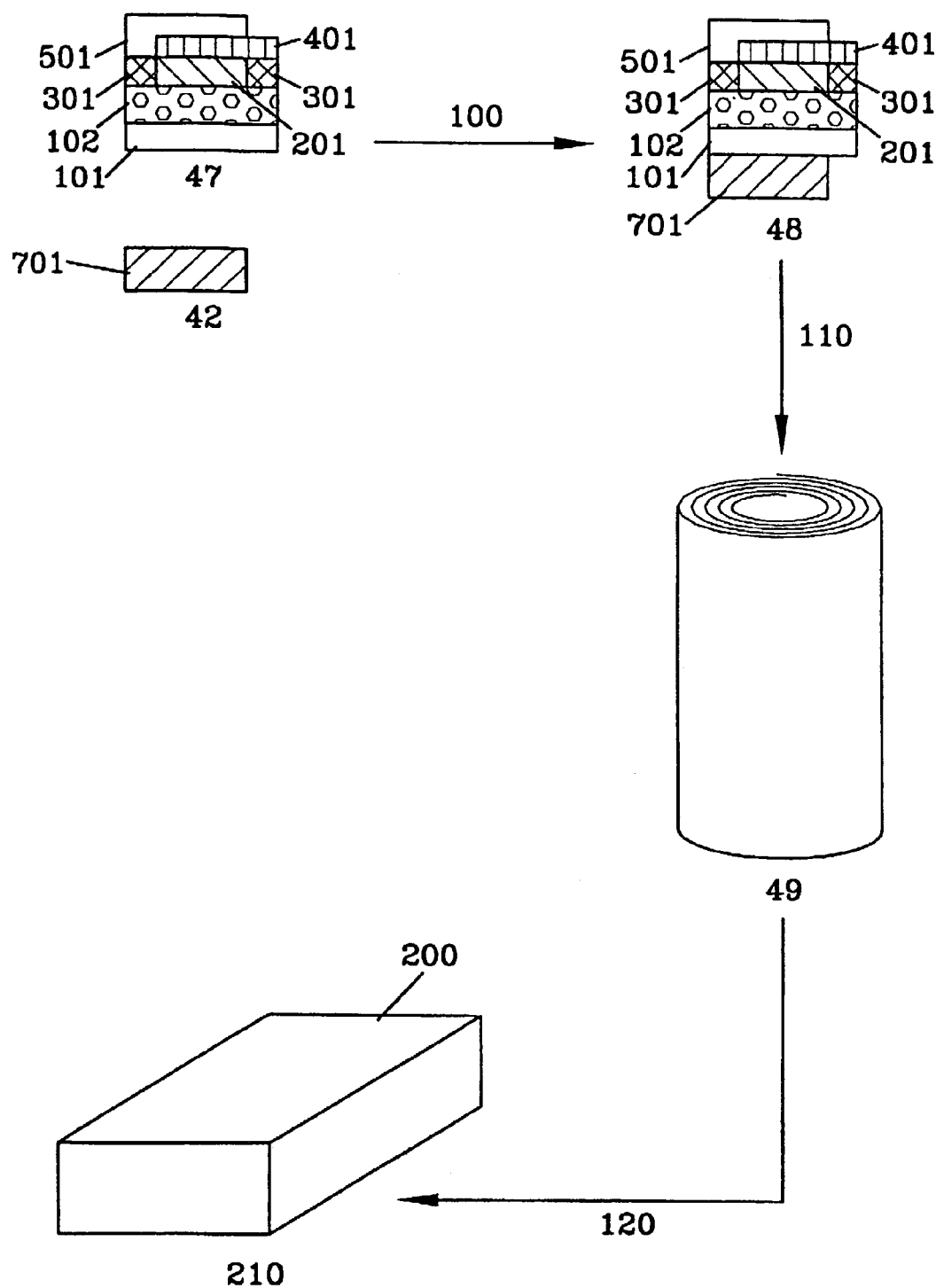
FIG. 11 shows a representative process flow diagram with cross-sectional views of one embodiment of the methods of preparing an electrochemical cell of the present invention, which comprises a combining step 100 utilizing an anode active layer 701 as one element and a cathode/separator assembly 47 as a second element, a winding step 110, and an electrolyte filling and sealing step 120.

Another aspect of this invention pertains to methods of preparing an electrochemical cell comprising a casing and a multilayer cell stack, which methods comprise the steps of (a) providing a laminar combination of: (i) an anode assembly comprising an anode comprising lithium metal; and, (ii) a cathode/separator assembly comprising a first protective coating layer having a first surface and a second surface on the side opposite to the first surface, a microporous separator layer having a first surface in contact with the second surface of the first protective coating layer and a second surface on the side opposite from the first protective coating layer, a cathode active layer in a first desired coating pattern on the second surface of the microporous separator layer, and an edge insulating layer in a second desired coating pattern on the second surface of the separator layer, wherein the cathode active layer has a first surface in contact in the first desired coating pattern with the second surface of the separator layer and has a second surface on the side opposite from the separator layer, and the edge insulating layer has a first surface in contact in the second desired coating pattern with the second surface of the separator layer and has a second surface on the side opposite to the separator layer; a cathode current collector layer in a third desired coating pattern on the second surface of the cathode active layer and on the second surface of the edge insulating layer, wherein the cathode current collector layer has a first surface in contact with the second surface of the cathode active layer and has a second surface on the side opposite from the cathode active layer; an electrode insulating layer in a fourth desired coating pattern on the second surface of the cathode current collector layer and on the second surface of the edge insulating layer, wherein the electrode insulating layer has a first surface in contact with the second surface of the cathode current collector layer and has a second surface on the side opposite from the cathode current collector layer; wherein the anode and the second surface of the electrode insulating layer are positioned in a face-to-face relationship: (b) winding the laminar combination to form an anode-electrode insulating layer-cathode current collector layer-cathode/separator assembly multilayer cell stack; (c) providing an electrolyte, wherein the electrolyte is contained in the pores of the separator layer of the multilayer cell stack; (d) providing a casing to enclose the multilayer cell stack; and (e) sealing the casing. FIG. 11 illustrates one embodiment of this aspect of the methods of the present invention.

Referring to FIG. 11 (not drawn to scale), in a combining step 100, cathode/separator assembly 47 comprising an electrode insulating layer 501, cathode current collector layer 401, cathode active layer 201, edge insulating layer 301, microporous separator layer 102, and first protective coating layer 101, which assembly 47 may be formed by the methods illustrated in FIGS. 8A and 8B, is combined with an anode assembly 42 comprising an anode active layer 701 comprising lithium metal to form an cathode/separator assembly-anode assembly combination 48. Next, in a winding step 110, combination 48 is wound, stacked, or otherwise combined to form an electrode insulating layer-cathode/separator assembly-anode assembly multilayer cell stack 49 having alternating assemblies of cathode/separator assembly 47 and anode assembly 42. Following this step 110, in an electrolyte filling and sealing step 120, multilayer cell stack 49 is provided with electrolyte in the pores of the separator layer and is further provided with a casing 200 which is sealed around the cell stack to form the electrochemical cell 210. The wide variety of sizes and shapes possible for the cell stack and the casing and the variety of options for introducing the electrolyte at different steps in the process are as described hereinabove for the embodiment illustrated in FIG. 9.

In one embodiment, the cathode/separator assembly of step (a) further comprises a temporary carrier substrate on the first surface of the first protective coating layer, and the methods further comprise the step of removing the temporary carrier substrate from the first surface of the first protective coating layer prior to completion of step (b). In one embodiment, the anode and the first surface of the first protective coating layer of the cathode/separator assembly are positioned in a face-to-face relationship in step (a), and an anode-cathode/separator assembly-cathode current collector layer-electrode insulating layer multilayer cell stack is formed in step (b).

A particular benefit of the methods of preparing electrochemical cells of the present invention is that only two layers, an anode assembly and a cathode/separator assembly, need to be combined in a laminar manner and then wound to form a multilayer cell stack instead of the more complex three layers of an anode assembly, a free-standing separator, and a cathode, in a typical cell fabrication method. Also, one aspect of the methods of preparing electrochemical cells of this invention pertains to only a single layer of anode, electrolyte element, and cathode which may be coated or deposited on a single temporary carrier substrate and then wound, after removing the temporary carrier substrate, to form a multilayer cell stack. Also, as illustrated in FIGS. 9 to 11, the anode assembly may have layers which may all be deposited by vacuum metalization or other metalizing techniques onto an electrode insulating layer, such as, for example, a polyester film; and the cathode/separator assembly may have layers which may all be coated by liquid-based coating methods, as known in the art of coating methods, onto the temporary carrier substrate, which is subsequently removed. This has the advantage of potentially having each assembly, either anode assembly or cathode/separator assembly, involve only a single manufacturing coating method so that each finished assembly may conveniently be prepared on a single unit of production equipment and possibly in a single processing pass through the equipment. A farther benefit is that the finished electrochemical cell contains only the substrate, if any, associated with the anode assembly. The cathode/separator assembly in the electrochemical cell may have no substrate since the temporary carrier substrate is removed prior to preparing the electrochemical cell. This is very important for minimizing the volume and weight of electrochemically inactive substrates in order to maximize the volumetric and gravimetric energy density of the electrochemical cell. For example, only 2 or 3 microns of an electrochemically inactive substrate in a AA size cell having an electrode area of 1000 $cm^2$ can result in a significant loss of energy density. Also, as illustrated, for example, in FIG. 11 with a lithium metal anode, the electrode insulating layer may be coated as a layer of the cathode/separator assembly and may be a very thin and tough coating such that no substrate is present in the electrochemical cell.

Electrochemical Cells

Another aspect of the present invention pertains to electrochemical cells prepared according to the methods of the present invention, as described herein. Thus, the electrochemical cells of the present invention comprise a cathode having a cathode active layer, an anode, and an electrolyte element interposed between the cathode and the anode, wherein the electrolyte element comprises (a) a microporous separator layer and (b) an electrolyte contained in pores of the separator; wherein the cells comprise a cathode/separator assembly comprising the cathode active layer, the microporous separator layer, and one or more protective coating layers, which cathode/separator assembly is prepared according to the methods of the present invention as described herein.

EXAMPLES

Several embodiments of the present invention are described in the following examples, which are meant by way of illustration and not by way of limitation.

Example 1

A coating mixture for a first step of making a protective coating layer was prepared by adding 17.5 g of a 4% by weight solution of polyvinyl alcohol (AIRVOL 125, a trademark for polyvinyl alcohol polymers available from Air Products, Inc., Allentown, Pa.) in water to 10.0 g of a 7.0% by weight solids solution of boehmite sol in water (CATA-LOID AS-3, a trademark for aluminum boehmite sols available from Catalysts & Chemicals Ind. Co., Ltd., Tokyo, Japan) and stirring to mix the materials. 0.10 g of ZONYL FSO-100, a trademark for non-ionic fluorochemical compounds available from E.I. duPont de Nemours, Wilmington, Del., was added with stirring to make the sol gel coating mixture. Using a gap coating with a slot opening of a set thickness to doctor the coating, the sol gel coating mixture was applied to the non-treated surface of 23 micron thick MELINEX 6328, a trademark for polyethylene terephthalate (PET) films available from DuPont Teijin Films, Wilmington, Del. After air drying in a laboratory hood under a high rate of circulation, a smooth and uniform microporous xerogel layer with a dry thickness of 0.7 microns was formed on the PET plastic film substrate. Using the dry coating density and thickness method described herein, the porosity of this xerogel coating layer was calculated to be 50%.

A coating mixture for the second step of making the protective coating layer was prepared by adding 0.3 g of a 2:1 molecular complex of dimethoxyethane (DME or monoglyme):lithium tetrafluoroborate ($LiBF_4$) to 10 g of poly(ethylene glycol) divinyl ether (average molecular weight of about 240; available from Aldrich Chemical Company, Milwaukee, Wis.) and stirring to mix the two liquid components. The molecular weight of the poly(ethylene glycol) divinyl ether is about that of the divinyl ether of tetraethylene glycol. Using the same gap coating method with the slot opening, the multifunctional monomer coating mixture with the latent lithium ion catalyst was coated to fill the pores of the 0.7 micron xerogel layer and then cured at 130° C. for 2 minutes to crosslink the monomer to form the protective coating layer of polydivinyl-poly(ethylene glycol) in the pores of the boehmite xerogel layer. This protective coating layer was impervious to any penetration by dimethoxyethane (DME), 1,3-dioxolane, or 50:50 blends by weight of DME and 1,3-dioxolane when these liquids were placed on its surface. Also, this protective coating layer was impervious to penetration by DME, 1,3-dioxolane, or 50:50 DME:1,3-dioxolane containing 0.1 M lithium octasulfide when these liquids were placed on its surface. The ether structure of the crosslinked polydivinyl-poly(ethylene glycol) and of the ethylene oxide groups of the ZONYL FSO-100, as well as the small residual amount of the latent lithium ion catalyst provided ionic conductivity in the thin protective coating layer.

A coating mixture for a microporous separator layer was prepared by adding 17.5 g of a 4% by weight solution of AIRVOL 125 polyvinyl alcohol in water to 10.0 g of a 7.0% by weight solids solution of CATALOID AS-3 boehmite sol in water and stirring to mix the materials. 0.014 g of ZONYL FSO-100 was added with stirring to make the sol gel separator coating and to help promote good wetting of the separator coating on the protective coating layer which contains a high level of ZONYL FSO-100. Using the same gap coating method with a slot opening, the sol gel separator mixture was applied to the protective coating layer of crosslinked polydivinyl-poly(ethylene glycol) in the pores of the boehmite xerogel layer. After air drying in a laboratory hood under a high rate of air circulation, a smooth and unifrom microporous xerogel layer with a dry thickness of 7 microns was formed on the protective coating layer. A second microporous xerogel layer with a dry thickness of 7 microns was similarly formed on the first xerogel separator layer to give a total dry thickness of 14 microns. The porosity of this xerogel separator layer was calculated to be 50% from using the dry coating density and thickness method.

A cathode active layer with a composition by weight on a dry basis of 70% elemental sulfur (available from Aldrich Chemical Company, Milwaukee, Wis.), 20% PRINTEX XE-2 conductive carbon (a trademark for carbon pigments available from Degussa Corporation, Akron, Ohio), 5% FLUKA graphite 50870 (a trademark for graphite available from Fluka Chemical Company, Ronkonkoma, N.Y.), and 5% of LUVISKOL VA55E polyvinyl pyrrolidone-vinyl acetate (PVP/VA) copolymer (a trademark for polymers available from BASF Corporation, Mount Olive, N.J.) was prepared by suspending the dry ingredients in isopropanol and stirring, followed by adding the 50% solution of PVP/VA to provide an overall coating mix solids of 14% and then grinding in a ball mill for 12 hours. The cathode active layer coating mix was then coated onto the microporous xerogel separator layer using a second gap coating with slot opening that provided a narrower coating width than for the separator layer. After air drying as done for the separator coating, a uniform cathode active coating layer with a dry thickness of 15 microns was formed on the separator layer. There were uncoated lanes of separator layer on both sides of the cathode active layer due to the different widths of the coating applications.

The resulting composite of PET film as the temporary carrier substrate, the protective coating layer, the microporous separator layer, and the cathode active layer could be easily delaminated to cause the delamination of the protective coating layer from the PET film, thereby removing the PET film from the composite to form a free standing cathode/separator assembly of the protective coating layer, the microporous separator layer, and the cathode active layer.

This free standing cathode/separator assembly was found to be suitable for use in combining with an anode such as 50 micron lithium foil, an organic liquid electrolyte such as a 1.4 M solution of lithium imide (available from 3M Corporation, St. Paul, Minn.) in a 42:58 volume ratio mixture of 1,3-dioxolane and dimethoxyethane, and a cathode current collector such as nickel foil, to prepare a rechargeable electrochemical cell. The cell had a layered structure of anode-cathode/separator assembly (with the protective coating layer in a face to face relationship with the lithium anode)-cathode current collector with the liquid electrolyte filling the void areas of the microporous separator and the cathode active layer. The cell showed an initial specific capacity of over 500 mAh/g based on the weight of elemental sulfur present and showed more than a 20% increase in cycle life to a cutoff of specific capacity of 400 mAh/g, in comparison to a cell prepared in the same manner, except without the protective coating layer. Also, the free-standing cathode/separator assembly with the protective layer on one surface showed greatly increased mechanical strength and flexibility without breaking, in comparison to a free-standing cathode/separator assembly made in the same manner, except without the protective coating layer.

Example 2

A free-standing cathode/separator assembly was prepared as described in Example 1, except that a 5% solution of styrene-4-sulfonic acid sodium salt (available from Aldrich Chemical Company, Milwaukee, Wis.) was substituted for the multifunctional monomer coating mixture with the latent lithium ion catalyst. This free-standing cathode/separator assembly of Example 2 gave similar results when fabricated into rechargeable electrochemical cells as those found with the cathode/separator assembly of Example 1.

Example 3

A free-standing cathode/separator assembly was prepared as described in Example 1, except that a 7.0% by weight solids solution of ammonium zirconyl carbonate prepared by adding water to BACOTE 20, a trademark for zirconium compounds available from Magnesium Eleckton, Flemington, N.J., was substituted for the CATALOID AS-3 in both the first step of making the protective coating layer and in the step of making the microporous xerogel separator layer. The ammonium zirconyl carbonate is a precursor to zirconium oxide sols and, upon coating and drying, provides a zirconium oxide xerogel layer. This free-standing cathode/separator assembly of Example 3 showed more than twice the mechancial strength and flexibility without cracking as found with the free-standing cathode/separator assembly of Example 1. The free-standing cathode/separator assembly of Example 3 gave similar results when fabricated into rechargeable electrochemical cells as those found with the cathode/separator assembly of Example 1.

Example 4

A free-standing cathode/separator assembly was prepared as described in Example 3, except that a 5% solution of styrene-4-sulfonic acid sodium salt (available from Aldrich Chemical Company, Milwaukee, Wis.) was substituted for the multifunctional monomer coating mixture with the latent lithium ion catalyst. This free-standing cathode/separator assembly of Example 4 gave similar results when tested for mechanical strength and flexibility and when fabricated into rechargeable electrochemical cells as those found with the cathode/separator assembly of Example 3.

Example 5

A free-standing cathode/separator assembly was prepared as described in Example 1, except that a coating mixture of 15% by weight solids solution of PARALOID B-48 (a trademark for acrylic polymers available from Rohm & Haas Corporation, Philadelphia, Pa.) in toluene was used to apply an edge insulating layer onto the uncoated lanes on the separator layer prior to the delaminating step. The dry thickness of the edge insulating layer of the insulating non-porous acrylic polymer layer was the same thickness as that of the cathode active layer. The edge of the acrylic edge insulating layer on one side was in contact to the edge of one side of the cathode active layer. Special care was taken to coat the edge insulating layer only onto the separator layer and not to have any of the edge insulating layer be coated onto the PET film where its adhesion would interfere with the delamination step. Thus, the edge insulating layer was coated on the entire surface of the separator layer that was not coated with the cathode active layer, but was not coated onto the PET film. This free-standing cathode/separator assembly of Example 5 gave similar results when fabricated into rechargeable electrochemical cells as those found with the cathode/separator assembly of Example 1.

Example 6

A free-standing cathode/separator assembly was prepared as described in Example 1, except that 0.10 g of FLUORAD FC-430 (a trademark for fluorochemical compounds available from 3M Corporation, St. Paul, Minn.) was substituted for the 0.10 g of ZONYL FSO-100 in the first step of making the protective coating layer, and 0.014 g of FLUORAD FC-430 was substituted for the 0.014 g of ZONYL FSO-100 in the step of making the microporous xerogel separator layer. This free-standing cathode/separator assembly of Example 6 gave similar results when fabricated into rechargeable electrochemical cells as those found with the cathode/separator assembly of Example 1. Both FLUORAD FC-430 and ZONYL FSO-100 are perfluorinated compounds in that they both comprise perfluorinated moieties where the carbon atoms are fully substituted with fluorine instead of with hydrogen or other atoms, such as in $CF_3$— and —$CF_2$— moieties. The amount of Fluorad FC-430 used in the first step of making the protective coating layer could be greatly increased by, for example, factors of 5 and 10, without significant loss of the xerogel character of the protective coating layer and without significant loss of mechanical strength and flexibility to the protective coating layer. Increasing the amount of the FLUORAD FC-430 by a factor of 5 reduced the porosity to about 40%, and increasing the FLUORAD FC-430 by a factor of 10 reduced the porosity to about 10%. Progressively filling the pores of the xerogel layer with increased amounts of a fluorochemical release agent, which is typically trapped by virtue of its molecular weight in the pores, provides another approach for a single step preparation of a first protective coating layer providing a transport barrier against electrolyte solvents, anions of the ionic electrolyte salt, and anions of the cathode reduction products for increased cycle life of the electrochemical cell.

In contrast to the results with FLUORD FC-430, similarly increasing the amount of ZONYL FSO-100 in the first step of making the protective coating layer of Example 1 by a factor of 3 and of 5 significantly reduced the mechanical strength of the protective coating layer and made it very difficult to prepare the cathode/separator assembly. Also, replacing the 0.10 g of ZONYL FSO-100 in the first step of making the protective coating layer with 0.10 g of either ZONYL FSN-100 or ZONYL FS-300 significantly reduced the mechanical strength of the protective coating layer and made it very difficult to prepare the cathode/separator assembly.

While the invention has been described in detail and with reference to specific and general embodiments thereof, it will be apparent to one skilled in the art that various changes and modifications can be made therein without departing from the spirit and scope thereof.

What is claimed is:

1. A method of preparing a cathode/separator assembly of an electrochemical cell, wherein said cathode/separator assembly comprises a cathode active layer and as microporous separator layer, said method comprising the steps of:
   (a) coating a first protective coating layer on a temporary carrier substrate, wherein said first protective coating layer has a first surface in contact with said temporary carrier substrate and has a second surface on the side opposite from said temporary carrier substrate;
   (b) coating a microporous separator layer on said second surface of said first protective coating layer, wherein said separator layer has a first surface in contact with said second surface of first protective coating layer and has a second surface on the side opposite from said first protective coating layer;
   (c) coating a cathode active layer in a desired pattern on said second surface of said separator layer, wherein said cathode active layer has a first surface in contact with said second surface of said separator layer and has a second surface on the side opposite from said separator layer; and
   (d) removing said temporary carrier substrate from said first surface of said first protective coating layer to form said cathode/separator assembly.

2. The method according to claim 1, wherein said first protective coating layer is a single ion conducting layer.

3. The method according to claim 1, wherein said first protective coating layer is an ionically conductive layer which is impervious to dimethoxyethane and 1,3-dioxolane, and combinations thereof.

4. The method according to claim 1, wherein said first protective coating layer comprises a polymer selected from the group consisting of electrically conductive 30 polymers, ionically conductive polymers, sulfonated polymers, and hydrocarbon polymers.

5. The method according to claim 1, wherein said first protective coating layer comprises an ionically conductive polymer.

6. The method according to claim 5, wherein said ionically conductive polymer is a polydivinyl-poly(ethylene glycol).

7. The method according to claim 1, wherein said first protective coating layer comprises a sulfonated polymer.

8. The method according to claim 7, wherein said sulfonated polymer is a sulfonated polystyrene.

9. The method according to claim 1, wherein said first protective coating layer comprises a microporous xerogel layer.

10. The method according to claim 9, wherein said microporous xerogel layer comprises an organic polymer.

11. A method of preparing an electrochemical cell, said method comprising the steps of:
   (a) providing a cathode/separator assembly prepared by a method comprising the steps of:
   (i) coating a first protective coating layer on a temporary carrier substrate, wherein said first protective coating layer has a first surface in contact with said temporary carrier substrate and has a second surface on the side opposite from said temporary carrier substrate;
   (ii) coating a microporous separator layer on said second surface of said first protective coating layer, wherein said separator layer has a first surface in contact with said second surface of said first protective coating layer and has a second surface on the side opposite from said first protective coating layer;
   (iii) coating a cathode active layer in a desired pattern on said second surface of said separator layer, wherein said cathode active layer has a first surface in contact with said second surface of said separator layer and has a second surface on the side opposite from said separator layer; and
   (iv) removing said temporary carrier substrate from said first surface of said first protective coating layer to form said cathode/separator assembly;
   (b) providing an anode;
   (c) providing a cathode current collector layer;
   (d) providing an electrode insulating layer interposed between said anode and said cathode current collector layer; and,
   (e) providing an electrolyte, wherein said electrolyte is contained in the pores of said separator layer; wherein said first surface of said first protective coating layer of said cathode/separator assembly and said anode are positioned in a face-to-face relationship and said second surface of said cathode active layer and said cathode current collector layer are positioned in a face-to-face relationship.

12. The method according to claim 11, wherein said first protective coating is a single ion conducting layer.

13. The method according to claim 11, wherein said first protective coating layer is an ionically conductive layer which is impervious to dimethoxyethane and 1,3-dioxolane, and combinations thereof.

14. The method according to claim 11, wherein said first protective coating layer comprises a polymer selected from the group consisting of electrically conductive polymers, ionically conductive polymers, sulfonated polymers, and hydrocarbon polymers.

15. The method according to claim 11, wherein said first protective coating layer comprises a microporous xerogel layer.

16. The method according to claim 15, wherein said microporous xerogel layer comprises an organic polymer.

17. A method according to preparing an electrochemical cell, said method comprising the steps of:
   (a) coating a first protective coating layer on a temporary carrier substrate, wherein said first protective coating layer has a first surface in contact with said temporary carrier substrate and has a second surface on the side opposite from said temporary carrier substrate;
   (b) coating a microporous separator layer on said second surface of said is first protective coating layer, wherein said separator layer has a first surface in contact with said first protective coating layer and has a second surface on the side opposite from said first protective coating layer;
   (c) coating a cathode active layer in a desired pattern on said second surface of said separator layer, wherein said cathode active layer has a first surface in contact with said second surface of said separator layer and has a second surface on the side opposite from said separator layer;
   (d) depositing a cathode current collector layer in a desired pattern on said second surface of said cathode active layer, wherein said cathode current collector layer has a first surface in contact with said second surface of said cathode active layer and has a second surface on the side opposite from said cathode active layer;
   (e) depositing an electrode insulating layer in a desired pattern on said second surface of said cathode current collector layer, wherein said electrode insulating layer has a first surface in contact with said second surface of said cathode current collector layer and has a second surface on the side opposite from said cathode current collector layer;
   (f) depositing an anode current collector layer in a desired pattern on said second surface of said electrode insulating layer, wherein said anode current collector layer has a first surface in contact with said second surface of said electrode insulating layer and has a second surface on the side opposite from said electrode insulating layer;
   (g) depositing an anode active material layer in a desired pattern on said second surface of said anode current collector layer, wherein said anode active material layer has a first surface in contact with said second surface of said anode current collector layer and has a second surface on the side opposite to said anode current collector layer;
   (h) removing said temporary carrier substrate from said first surface of said first protective coating layer; and
   (i) providing an electrolyte, wherein said electrolyte is contained in the pores of said separator layer.

18. The method according to claim 17, wherein step (g) further comprises depositing an anode protective coating layer on said anode active material layer.

19. The method according to claim 18, wherein said anode protective coating layer is a single ion conducting layer.

* * * * *